United States Patent
Parker et al.

(10) Patent No.: US 10,513,592 B2
(45) Date of Patent: Dec. 24, 2019

(54) ANTI-FOG COMPOSITIONS AND PROCESSES FOR MAKING SAME

(71) Applicant: Celanese Acetate LLC, Irving, TX (US)

(72) Inventors: Kevin Parker, Derby (GB); Jo Marshall, Lichfield (GB)

(73) Assignee: CELANESE ACETATE LLC, Irving, TX (US)

( * ) Notice: Subject to any disclaimer, the term of this patent is extended or adjusted under 35 U.S.C. 154(b) by 674 days.

(21) Appl. No.: 14/488,422

(22) Filed: Sep. 17, 2014

(65) Prior Publication Data

US 2015/0079381 A1   Mar. 19, 2015

Related U.S. Application Data

(60) Provisional application No. 61/879,570, filed on Sep. 18, 2013.

(51) Int. Cl.

| | | |
|---|---|---|
| *C08K 3/36* | (2006.01) |
| *C08K 5/11* | (2006.01) |
| *C08K 5/523* | (2006.01) |
| *C08K 5/12* | (2006.01) |
| *C08K 5/07* | (2006.01) |
| *C08K 5/1515* | (2006.01) |
| *C08K 5/521* | (2006.01) |
| *B29D 7/01* | (2006.01) |
| *B29C 41/12* | (2006.01) |
| *C08J 5/18* | (2006.01) |
| *B32B 7/12* | (2006.01) |
| *B32B 23/04* | (2006.01) |
| *B32B 23/08* | (2006.01) |
| *B32B 23/16* | (2006.01) |
| *B32B 23/20* | (2006.01) |
| *B32B 27/32* | (2006.01) |
| *B32B 27/36* | (2006.01) |
| *B29K 1/00* | (2006.01) |
| *B29K 105/00* | (2006.01) |
| *B29K 509/08* | (2006.01) |

(52) U.S. Cl.
CPC ............... *C08K 3/36* (2013.01); *B29C 41/12* (2013.01); *B29D 7/01* (2013.01); *B32B 7/12* (2013.01); *B32B 23/04* (2013.01); *B32B 23/08* (2013.01); *B32B 23/16* (2013.01); *B32B 23/20* (2013.01); *B32B 27/32* (2013.01); *B32B 27/36* (2013.01); *C08J 5/18* (2013.01); *C08K 5/07* (2013.01); *C08K 5/11* (2013.01); *C08K 5/12* (2013.01); *C08K 5/1515* (2013.01); *C08K 5/521* (2013.01); *C08K 5/523* (2013.01); *B29K 2001/12* (2013.01); *B29K 2105/0005* (2013.01); *B29K 2105/0038* (2013.01); *B29K 2509/08* (2013.01); *B32B 2250/02* (2013.01); *B32B 2250/03* (2013.01); *B32B 2250/04* (2013.01); *B32B 2250/05* (2013.01); *B32B 2250/24* (2013.01); *B32B 2264/102* (2013.01); *B32B 2307/40* (2013.01); *B32B 2307/732* (2013.01); *B32B 2419/00* (2013.01); *B32B 2439/00* (2013.01); *B32B 2509/10* (2013.01); *B32B 2551/00* (2013.01); *C08J 2301/12* (2013.01)

(58) Field of Classification Search
CPC ... B29C 41/12; B29C 39/003; B29C 71/0009; C08K 5/12; C08K 5/07; C08K 5/11; C08K 5/521; C08K 5/527; B29D 7/01; C08J 3/18; C08J 5/18
See application file for complete search history.

(56) References Cited

U.S. PATENT DOCUMENTS

| | | | |
|---|---|---|---|
| 2,232,012 A | 2/1941 | Rooney et al. | |
| 3,528,833 A | 9/1970 | Taskier | |
| 4,828,345 A * | 5/1989 | Kitamura | G02B 1/10 359/360 |
| 2002/0041352 A1* | 4/2002 | Kuzuhara | G02B 5/3083 349/117 |

(Continued)

FOREIGN PATENT DOCUMENTS

| | | | |
|---|---|---|---|
| JP | 2013-099879 | 5/2013 | |
| WO | WO 2008/029801 | 3/2008 | |
| WO | WO-2011135980 A1 * | 11/2011 | ............. C08J 5/18 |

OTHER PUBLICATIONS

International Search Report and Written Opinion for PCT/US2014/055999 dated Nov. 26, 2014.

(Continued)

*Primary Examiner* — Frank J Vineis
*Assistant Examiner* — Laura B Figg
(74) *Attorney, Agent, or Firm* — Kilpatrick Townsend & Stockton LLP

(57) ABSTRACT

Anti-fog compositions comprising a primary film having opposing major planar surfaces and a central coplanar region, and processes for making such anti-fog compositions. The central coplanar region is disposed between the opposing major planar surfaces. The primary film comprises cellulose acetate, plasticizer, and an anti-blocking agent. The anti-blocking agent has an average particle size ranging from 0.02 microns to 6 microns. The cellulose acetate has a degree of substitution that increases from the opposing major planar surfaces toward the central coplanar region or that is substantially constant throughout the thickness of the composition. The composition is formed by saponifying a precursor film to improve hydrophilicity.

20 Claims, No Drawings

(56) References Cited

U.S. PATENT DOCUMENTS

| | | | | |
|---|---|---|---|---|
| 2002/0102369 A1* | 8/2002 | Shimizu | ............... | C08F 251/02 428/1.33 |
| 2004/0024198 A1* | 2/2004 | Shibata | ................... | C08B 3/06 536/69 |
| 2009/0195152 A1* | 8/2009 | Sawano | ................ | B82Y 20/00 313/504 |
| 2013/0045340 A1* | 2/2013 | Sato | ......................... | C08J 5/18 428/1.33 |

OTHER PUBLICATIONS

Database, WPI Thompson Scientific, XP002732557.
European Patent Application No. 14780962.8, dated Sep. 9, 2019.
Anonymous: "Horiba Scientific, A Guidebook to Particle Size Analysis", Jan. 1, 2012 (Jan. 1, 2012), pp. 1-32, XP055060732, Irvine, CA 92618, USA Retrieved from the Internet: URL:http:www.horiba.com/fileadmin/uploads/Scientific/eMag/PSN Guidebook/pdf/PSA_Guidebook.pd!.
ASTM D 1003-11 Standard Test Method for Haze and Luminous Transmittance of Transparent Plastics, ASTM Designa, ASTM International, US, vol. ASTM D 1003-11, Jan. 1, 2011 (Jan. 1, 2011), pp. 223-229. XP009179395.
John A. Howarter et al: "Self-Cleaning and Next Generation AntiFog Surfaces and Coatings", Macromolecular Rapid Communications, vol. 29, No. 6, Mar. 19, 2008 (Mar. 19, 2008), pp. 455-466. XP055612491.

\* cited by examiner

US 10,513,592 B2

ANTI-FOG COMPOSITIONS AND PROCESSES FOR MAKING SAME

PRIORITY CLAIM

This application claims priority to U.S. Provisional Application No. 61/879,570, filed on Sep. 18, 2013. The entirety of this application is incorporated by reference herein.

FIELD OF THE INVENTION

The present invention relates generally to anti-fog compositions and processes for making anti-fog compositions. In particular, the present invention relates to anti-fog compositions comprising cellulose acetate, plasticizer, and anti-blocking agent.

BACKGROUND OF THE INVENTION

Film compositions are often utilized with many substrates to provide beneficial characteristics and/or properties to the substrate. As one example, conventional fog resistant films may be applied to glass or mirrored surfaces to prevent the formation of water droplets thereon.

Many conventional fog resistant films comprise multiple laminated layers, e.g., a polycarbonate or polyester layer with a polyurethane or silane coating. These layers may be formulated so that the layers adhere to one another. In use, however, these layers may separate from one another, creating performance and/or durability problems.

Other conventional fog resistant films utilize a one-piece configuration. These fog resistant films may comprise a cellulose ester portion and a fog resistant region. The fog resistant film may be formed by treating a cellulose acetate film with an alkali solution. Japanese Patent Application No. 2013099879A and International Publication No. 2008/029801A1, both of which are incorporated herein by reference, disclose such fog resistant films and methods for preparing such films. These fog resistant films, however, may suffer from insufficient fog resistance and/or a lack of film transparency, e.g., haziness.

The need exists for an anti-fog composition having improved anti-fogging characteristics and/or improved clarity, e.g., reduced haziness.

SUMMARY OF THE INVENTION

In one embodiment, the invention relates to an anti-fog composition, comprising a primary film having opposing major planar surfaces and a central coplanar region disposed between said opposing major planar surfaces. The primary film comprises cellulose acetate, plasticizer, and an anti-blocking agent having an average particle size ranging from 0.02 microns to 6 microns. The cellulose acetate has a degree of substitution that increases from the opposing major planar surfaces toward the central coplanar region. The composition may have a degree of substitution at the opposing major planar surfaces of about zero. The composition may have a degree of substitution at the central coplanar region from 2.0 to 2.6, preferably from 2.2 to 2.55. The composition may have a fog time, as defined herein, greater than 10 seconds. The composition may have a haze value ranging from 0.1% to 4.0%, as measured by ASTM D1003. The plasticizer may be selected from the group consisting of 1,2,3-triacetoxypropane (triacetin), tributyl citrate, triethyl citrate, triphenyl phosphate, tris(clorisopropyl) phosphate, dimethyl phthalate, bornan-2-one, PEG-DGE, PPG-DGE, tributyl phosphate, and combinations thereof. In preferred embodiments, the plasticizer comprises diethyl phthalate. The anti-blocking agent preferably comprises silica. The primary film may comprise from 60 wt % to 95 wt % cellulose acetate, from 5 to 40 wt. % plasticizer, and from 0.01 to 10 wt. % anti-blocking agent. The primary film may further comprise a releasing agent. The anti-blocking agent may have an average particle size less than 3 microns, preferably less than 1 micron or from 0.02 to 1 micron. The anti-fog composition may have a thickness ranging from 25 microns to 2000 microns and may be in the form of a rolled sheet. The anti-fog composition may or may not comprise discrete layers. The composition may further comprise a protective film adhered to one of the major planar surfaces. The protective film may comprise a protective material selected from polyesters, polyethylene, and polyethylene terephthalate, and wherein the protective film is adhered to at least one of the major planar surfaces with an adhesive. The composition may further comprise an adhesive layer disposed on the other of the major planar surfaces of the primary film. The composition may further comprise a secondary film adhered to the primary film and having substantially the same composition as the primary film. The composition may further comprise a secondary film adhered to the primary film and having a composition different from the primary film. The secondary film may comprise cellulose acetate, wherein the cellulose acetate in the secondary film has a degree of substitution greater than the degree of substitution of the primary film.

In one embodiment, the invention relates to a consumer product having a planar surface and the inventive anti-fog composition disposed on the planar surface. The consumer product may be selected from the group consisting of lenses, windows, screens, glass structures, containers, appliances, plastic, optical devices, and visors. The consumer product may be a refrigerating device. The anti-fog composition may be adhered to said planar surface with an adhesive.

In one embodiment, the invention relates to an anti-fog composition comprising a primary film comprising cellulose acetate, plasticizer, and an anti-blocking agent having an average particle size ranging from 0.02 microns to 6 microns. The anti-fog composition has a fog time greater than 10 seconds. The plasticizer may comprise a phthalate plasticizer and the anti-blocking agent may comprise silica. The anti-fog composition may have a haze value ranging from 0.1% to 4.0%, as measured by ASTM D1003. The composition may comprise from 60 wt % to 95 wt % cellulose acetate, from 5 to 40 wt. % plasticizer; and from 0.01 to 10 wt. % anti-blocking agent.

In one embodiment, the invention relates to an anti-fog composition comprising a primary film comprising cellulose acetate, a plasticizer, and an anti-blocking agent. The anti-fog composition may have a fog time greater than 10 seconds. The anti-fog composition may have a haze value ranging from 0.1% to 4.0%, as measured by ASTM D1003. The anti blocking agent may comprise silica having an average particle size ranging from 0.02 microns to 6 microns. The composition may comprise from 60 wt % to 95 wt % cellulose acetate, from 5 wt % to 40 wt. % plasticizer; and from 0.01 wt % to 10 wt % wt. % anti-blocking agent. The plasticizer may comprise diethyl phthalate.

In one embodiment, the invention relates to an anti-fog composition comprising a primary film comprising a mixture of cellulose acetate a phthalate plasticizer, and an anti-blocking agent having an average particle size ranging from 0.02 microns to 6 microns. The anti-fog composition may have a moisture, e.g., water, vapor transmission rate (MVTR) greater than 100 g/m²/day. The anti-blocking agent may comprise silica.

In one embodiment, the invention relates to an anti-fog composition comprising a primary film comprising a mixture of cellulose acetate, diethyl phthalate, and an anti-blocking agent comprising silica and having an average particle diameter ranging from 0.02 microns to 6 microns. The anti-fog composition may have a fog time greater than 10 seconds.

In one embodiment, the invention relates to a process for producing an anti-fog composition comprising a primary film, the process comprising the steps of combining cellulose acetate, a plasticizer, an anti-blocking agent having an average particle size ranging from 0.02 microns to 6 microns and solvent to form a dope, casting the dope to form a precursor film, contacting the precursor film with a caustic solution to form a treated film, washing the treated film to form a washed film, and drying the washed film to form the primary film. The primary film may have opposing major planar surfaces and a central coplanar region disposed between said opposing major planar surfaces. The cellulose acetate may have a degree of substitution that increases from the opposing major planar surfaces toward the central coplanar region. The process may further comprise the step of treating the precursor film with acetone prior to the contacting step. The precursor film may have a degree of substitution ranging from 2.0 to 2.6. The dope may comprise cellulose acetate flake. The caustic solution may comprise an aqueous hydroxide solution. The caustic solution may comprise a 5 to 20 wt. % potassium hydroxide solution. The contacting may be conducted for a residence time ranging from 0.5 minutes to 20 minutes. The contacting may be conducted at a temperature ranging from 40° C. to 100° C. The washing may be conducted at a temperature ranging from 0° C. to 50° C. The drying may be conducted at a temperature ranging from 50° C. to 120° C. The anti-fog composition may have a fog time greater than 10 seconds. The anti-fog composition may have a haze value ranging from 0.1% to 4.0%, as measured by ASTM D1003.

In one embodiment, the invention relates to a process for producing a multi-layer anti-fog film composition, comprising the steps of providing a first anti-fog film composition comprising a cellulose acetate, a plasticizer, and an anti-blocking agent having an average particle diameter ranging from 0.02 microns to 6 microns; selecting a second film composition based on a first preferred characteristic; and adhering the first anti-fog film composition to the second film composition to form the multi-layer anti-fog film composition having enhanced characteristics. The preferred characteristic may be selected such that the first anti-fog composition improves the preferred characteristic.

In one embodiment, the invention relates to an anti-fog composition comprising a primary film having a thickness, opposing major planar surfaces and a central coplanar region disposed between the opposing major planar surfaces. The primary film comprises cellulose acetate, plasticizer, and an anti-blocking agent having an average particle size less than 6 microns. The degree of substitution throughout the thickness of the primary film is substantially uniform, and optionally is less than 2.6, less than 2.0, less than 1.5, less than 1.0 or less than 0.5, and optionally greater than 0.01. In one aspect, the degree of substitution of the cellulose acetate at the central coplanar region is not be greater than 10% different from the degree of substitution of at least one of the opposing major planar surfaces.

In one embodiment, the invention relates to a multi-layer anti-fog composition, comprising a primary film having opposing major planar surfaces and a central coplanar region disposed between the opposing major planar surfaces and comprising cellulose acetate having a first degree of substitution less than 2.6 and a secondary film having opposing major planar surfaces and a central coplanar region disposed between the opposing major planar surfaces. One of the opposing major surfaces of the secondary film is adhered to one of the opposing major planar surfaces of the primary film. The secondary film comprises cellulose acetate having a second degree of substitution greater than the first degree of substitution. The composition may further comprise an additional film adhered to the other of the opposing major planar surfaces of the secondary film. The additional film has opposing major planar surfaces and a central coplanar region disposed between the opposing major planar surfaces. One of the opposing major surfaces may be adhered to the other of the opposing major planar surfaces of the secondary film. The additional film comprises cellulose acetate may have a degree of substitution greater than the second degree of substitution.

In one embodiment, the invention relates to an anti-fog composition comprising a primary film having opposing major planar surfaces and a central coplanar region disposed between said opposing major planar surfaces. The primary film comprises cellulose acetate, plasticizer, optionally anti-blocking agent, and from 0.01 wt % to 3 wt % acetone.

In one embodiment, the invention relates to an anti-fog composition comprising a primary film having opposing major planar surfaces and a central coplanar region disposed between said opposing major planar surfaces. The primary film comprises cellulose acetate, plasticizer, and an anti-blocking agent having an average particle size ranging from 0.02 microns to 6 microns.

In one embodiment, the invention relates to a multi-layer anti-fog composition, comprising a first primary film having opposing major planar surfaces and a central coplanar region disposed between the opposing major planar surfaces and comprising cellulose acetate plasticizer, and an anti-blocking agent having an average particle size ranging from 0.02 microns to 6 microns with the cellulose acetate having a degree of substitution that increases from the opposing major planar surfaces toward the central coplanar region; a secondary film having opposing major planar surfaces and a central coplanar region disposed between the opposing major planar surfaces with one of the opposing major surfaces of the secondary film being adhered to one of the opposing major planar surfaces of the first primary film; and a second primary film having opposing major planar surfaces and a central coplanar region disposed between the opposing major planar surfaces and comprising cellulose acetate plasticizer, and an anti-blocking agent having an average particle size ranging from 0.02 microns to 6 microns with the cellulose acetate having a degree of substitution that increases from the opposing major planar surfaces toward the central coplanar region. The other of the opposing major surfaces of the secondary film is adhered to one of the opposing major planar surfaces of the second primary film.

In one embodiment, the invention relates to a process for producing an anti-fog composition comprising a primary film comprising the steps of extruding pellets comprising cellulose acetate, a plasticizer, and an anti-blocking agent having an average particle size ranging from 0.02 microns to 6 microns, and optionally an antioxidant and/or a heat stabilizer, to form a precursor film, preferably having a thickness less than 300 microns, more preferably less than 200 microns; contacting the precursor film with a caustic solution to form a treated film; washing the treated film to form a washed film; and drying the washed film to form the primary film.

DETAILED DESCRIPTION OF THE INVENTION

It has now been discovered that the caustic treatment of a film precursor formed using a specific anti-blocking agent having a particularly small average particle size, e.g., from 0.02 microns to 6 microns, results in the preparation of a fog resistant (anti-fog) composition having a superior combination of properties, e.g., increased fog time and reduced haziness. The compositions of the invention beneficially do not exhibit the separation problems that are commonly observed with conventional fog resistant films.

Anti-Fog Composition and Primary Film

In the production processes, a precursor film is prepared, preferably by solvent casting a dope comprising cellulose acetate, a plasticizer, an anti-blocking agent and solvent. The precursor film is treated with a caustic solution, e.g., a basic solution such as a potassium hydroxide solution, under conditions effective to form an anti-fog composition that, in use, allows some moisture to seep into or absorb into the anti-fog composition (as opposed to allowing the water to pool atop the film).

Without being bound by theory, the specific caustic treatment of the precursor film modifies, e.g., reduces, the degree of acetyl substitution of the cellulose acetate increasing its anti-fog characteristics. When the specific caustic treatment is utilized to treat a precursor formed from the particular components discussed herein, a unique anti-fog composition having a highly desirable combination of performance characteristics is formed. Depending on the caustic treatment conditions, e.g., thickness of the precursor film and/or caustic treating time, the degree of substitution of the resulting anti-fog film may be substantially constant throughout the film or may increase from opposing major planar surfaces of the film toward a center coplanar region of the film. Modifying, e.g., reducing, the degree of substitution of the precursor film in this manner provides for increased hydrophilicity near the major planar surfaces of the anti-fog composition, allowing for increased water absorption and improved anti-fogging characteristics.

The present invention also relates to the anti-fog compositions formed by the processes of the invention. In one embodiment, the anti-fog composition comprises a primary film having opposing major planar surfaces and a central coplanar region. The central coplanar region is disposed between the opposing major planar surfaces. In one embodiment, the primary film comprises cellulose acetate, plasticizer, and an anti-blocking agent. The anti-blocking agent may have an average particle size less than 6 microns, e.g., less than 5 microns, less than 4 microns, less than 3 microns, less than 2 microns, or less than 1 micron. In terms of ranges, the anti-blocking agent desirably has a small average particle size, e.g., from 0.02 microns to 6 microns, from 0.02 microns to 5 microns, from 0.02 microns to 3 microns, from 0.02 microns to 1 micron, from 0.05 microns to 6 microns, from 0.05 microns to 5 microns, from 0.1 micron to 5 microns, from 0.1 microns to 4 microns, from 0.5 microns to 5 microns, from 0.5 microns to 4 microns, from 0.5 microns to 3 microns, from 0.5 microns to 3 microns, from 1 micron to 6 microns, from 1 micron to 5 microns, or from 1 micron to 4 microns. The particle size may be determined, for example, by sieve analysis. Many conventional anti-fog compositions, e.g., those formed via extrusion processes, do not experience inter-layer problems, e.g., "glass bonding effects," which necessitate the use of anti-blocking agents. Thus, conventional extrusion-formed films typically do not contain anti-blocking agents.

In some embodiments, the cellulose acetate in the primary film has a degree of substitution that increases from the opposing major planar surfaces toward the central coplanar region. That is, the anti-fog composition may have a "decreasing degree of substitution gradient," e.g., a degree of substitution that is less at the outside planar surfaces of the anti-fog composition and increases toward the center coplanar region of the anti-fog composition. In one embodiment, the degree of substitution at one or more of the opposing major planar surfaces is less than 2.6, e.g., less than 2.55, less than 2.5, less than 2.0, less than 1.5, less than 1.0, or less than 0.5. In terms of lower limits, the degree of substitution at one or more of the opposing major planar surfaces may be at least 0.1, e.g., at least 0.2, at least 0.3, or at least 0.5. In one embodiment, the degree of substitution at one or more of the opposing major planar surfaces is substantially zero, e.g., from 0 to 0.5 or from 0 to 0.25. In terms of ranges, the degree of substitution at one or more of the opposing major planar surfaces may range from 0 to 2.6, e.g., from 0 to 2.55, from 0.1 to 2.5, from 0.2 to 2, or from 0.3 to 1.5. In some embodiments, the degree of substitution at the central coplanar region ranges from 2.0 to 2.6, e.g., from 2.0 to 2.55, from 2.1 to 2.55, from 2.2 to 2.55, or from 2.3 to 2.55. In terms of upper limits, the degree of substitution at the central coplanar region may be less than 2.6, e.g., less than 2.55, less than 2.5, less than 2.4, less than 2.3, or less than 2.2, but preferably at least 2.0, e.g., at least 2.1, or at least 2.3. The degree of substitution of the primary film affects the hydrophilicity of the precursor film and its ability to act as an anti-fog composition, with lower degrees of substitution corresponding to increased hydrophilicity. The increased hydrophilicity in turn allows for increased water absorption in the primary film, which beneficially provides for a longer lasting anti-fogging effect. The combination of this longer lasting anti-fogging effect with the improvements in haze properties (as provided for by utilizing the specific composition of the precursor film) results in a highly desirable anti-fog composition.

In some embodiments, the anti-fog composition comprises a primary film having opposing major planar surfaces and a central coplanar region that is disposed between the opposing major planar surfaces, and the cellulose acetate in the primary film of the anti-fog compositions has a degree of substitution that is substantially uniform over the (cross sectional) thickness of the anti-fog composition, optionally varying by no more than 0.75, by no more than 0.5, or by no more than 0.25, throughout the thickness of the primary film. In some embodiments, the cellulose acetate in the primary film of the anti-fog composition has a degree of substitution less than 2.6, e.g., less than 2.55, less than 2.5, less than 2.45, less than 2.3, less than 2.0, less than 1.75, less than 1.5, less than 1.0, less than 0.75, or less than 0.5. In terms of ranges, the degree of substitution of the cellulose acetate may range from 0 to 2.6, e.g., from 0 to 2.55, from 0 to 2.5, from 0.1 to 2.55, or from 0.1 to 1, between the opposing major planar surfaces. In one embodiment, the degree of substitution of the cellulose acetate at the central coplanar region is not greater than 10% different, e.g., not greater than 5% different, from the degree of substitution of at least one of the opposing major planar surfaces. Such anti-fog compositions will have a low and substantially uniform degree of substitution, as compared to conventional films, e.g., films than have not been sufficiently treated. Also, such anti-fog compositions comprise the components discussed herein, which are not present in conventional anti-fog compositions formed by other production methods, e.g., extrusion methods. In one embodiment, the anti-fog composition may be produced by forming a precursor film, e.g., using the components discussed herein, and then treating the precursor film with a caustic solution. The precursor film may be treated with the caustic solution treatment for an extended period of time, as compared to conventional treatments, which may only last a few seconds. For example, the caustic solution treatment may be performed for at least 5 minutes, e.g., at least 7 minutes, at least 10 minutes, at least 12 minutes, at least 15 minutes, at least 17 minutes, or at least 20 minutes. Such anti-fog compositions have the beneficial characteristics of improved anti-fogging characteristics and/or improved clarity, e.g., lack of haziness, as a result of the combination of the caustic treatment step and the specific precursor film composition.

The thickness of the precursor film may be a factor in the duration of the caustic solution treatment and the resulting characteristics of the anti-fog compositions. For example, a thinner film may require a shorter treatment time to achieve the desired anti-fog property than a thicker film.

The primary film, in some embodiments, does not comprise discrete layers, unlike some conventional films that utilize a multi-layer construction comprising a base layer, e.g., a cellulose acetate layer, a polycarbonate layer, or a polyethylene teraphthalate layer, and an anti-fog layer. As such, the present anti-fog compositions beneficially may avoid the problems associated with adherence of an anti-fog layer to a base layer, e.g., eventual separation of the layers during use.

The anti-fog composition, in one embodiment, comprises from 60 wt % to 95 wt % cellulose acetate, e.g., from 65 wt % to 90 wt %, from 70 wt % to 90 wt %, or from 75 wt % to 85 wt %. In terms of lower limits, the anti-fog composition may comprise at least 60 wt % cellulose acetate, e.g., at least 65 wt %, at least 70 wt % or at least 75 wt %. In terms of upper limits, the anti-fog composition may comprise less than 95 wt % cellulose acetate, e.g., less than 90 wt % or less than 85 wt %.

The anti-fog composition, in one embodiment, comprises from 5 wt % to 40 wt % plasticizer, e.g., from 5 wt % to 35 wt %, from 10 wt % to 30 wt %, or from 15 wt % to 25 wt %. In terms of lower limits, the anti-fog composition may comprise at least 60 wt % plasticizer, e.g., at least 5 wt %, at least 10 wt % or at least 15 wt %. In terms of upper limits, the anti-fog composition may comprise less than 95 wt % plasticizer, e.g., less than 40 wt %, less than 35 wt %, less than 30 wt %, or less than 25 wt %.

The anti-fog composition, in one embodiment, comprises from 0.01 wt % to 10 wt % anti-blocking agent, e.g., from 0.05 wt % to 5 wt %, from 0.05 wt % to 1 wt %, or from 0.05 wt % to 0.5 wt %. In terms of lower limits, the anti-fog composition may comprise at least 0.01 wt %, at least 0.05 wt % or at least 0.07 wt % anti-blocking agent. In terms of upper limits, the anti-fog composition may comprise less than 10 wt % anti-blocking agent, e.g., less than 7 wt %, less than 5 wt %, less than 1 wt %, or less than 0.5 wt %. Additional details of the components of the above-mentioned components are provided herein.

In some embodiments, particular anti-fog compositions have unique combinations of components, which result in desired performance characteristics. For example, the plasticizer may comprise a phthalate plasticizer such as diethyl phthalate. The anti-blocking agent may comprise silica. In some cases, combinations of these specific components result in anti-fog compositions having the desirable characteristics discussed herein. As another example, the primary film comprises cellulose acetate, plasticizer (e.g., phthalate plasticizer such as diethyl phthalate plasticizer, optionally anti-blocking agent (e.g., silica) and from 0.01 wt % to 3 wt % acetone.

In some embodiments, the anti-fog composition further comprises a releasing agent, which allows the anti-fog composition to release from various components during or after the production process, e.g., releasing from a casting band. In one embodiment, the anti-fog composition comprises from 0.01 wt % to 10 wt % releasing agent, e.g., from 0.05 wt % to 5 wt %, from 0.05 wt % to 1 wt %, or from 0.05 wt % to 0.5 wt %. In terms of lower limits, the anti-fog composition may comprise at least 0.01 wt %, at least 0.05 wt % or at least 0.07 wt % releasing agent. In terms of upper limits, the anti-fog composition may comprise less than 10 wt % releasing agent, e.g., less than 7 wt %, less than 5 wt %, less than 1 wt %, or less than 0.5 wt %. The composition of the releasing agent may vary widely, and many releasing agents are known in the art. In one embodiment, the releasing agent comprises stearic acid. The releasing agent is preferably added to, e.g., mixed into, the dope. In such cases, the release agent preferably is dissolved into the dope. In one embodiment, the releasing agent is deposited or injected onto the casting band upon which the anti-fog composition is cast. As the anti-fog composition is released from the casting band, some of the releasing agent may remain with the anti-fog composition and/or some of the release agent may remain with the casting band (based on the attraction of the release agent to the metal).

In some embodiments, the anti-fog composition comprises residual acetone from the manufacturing process. For example, the anti-fog composition may comprise from 0.01 wt % to 3 wt % acetone, e.g., from 0.05 wt % to 2 wt %, from 0.05 wt % to 1 wt %, or from 0.05 to 0.5 wt %. In terms of lower limits, the anti-fog composition may comprise at least 0.01 wt % acetone, e.g., at least 0.05 wt % or at least 0.1 wt %. In terms of upper limits, the anti-fog composition may comprise less than 3 wt % acetone, e.g., less than 2 wt %, less than 1 wt %, less than 0.5 wt %, or less than 0.1 wt %.

Performance Characteristics

The anti-fog composition, in some embodiments, has a fog time greater than 20 seconds, e.g., greater than 30 seconds, greater than 40 seconds, greater than 50 seconds, greater than 60 seconds, or greater than 70 seconds. In terms of ranges, the anti-fog composition may have a fog time ranging from 20 seconds to 150, e.g., from 20 seconds to 100 seconds or from 30 seconds to 90 seconds. In one embodiment, the fog time may be determined by placing an anti-fog film of the invention over a beaker of heated water, e.g., heated to approximately 50° C., and measuring the time taken for a fog to form, if any. The sample may be placed at a predetermined distance from the film, e.g., approximately 6 cm. In other cases, test methods EN166 and/or EN168.16 may be utilized.

The anti-fog composition, in some embodiments, has a haze value, e.g., an ASTM D1003 haze value, less than 2%, e.g., less than 1.5%, less than 1.2%, or less than 1%. In terms of ranges, the anti-fog composition may have a haze value ranging from 0 to 2%, e.g., from 0.1% to 1.5%, from 0.2% to 1%, or from 0.6% to 1%. In one embodiment, the haze may be measured by hazemeter. In one embodiment, haze may be measured with properly sized specimens having substantially plane-parallel surfaces, e.g., flat without wrinkling, free of dust, scratches, and particles, of about 0.85 mm in thickness using an UtraScan Pro analyzer from Hunter Labs with haze setting of D65/10.

In one embodiment, the anti-fog composition has haze Δ ranging from 0% to 10% as determined measuring haze before and after rubbing with a microfiber cloth under 1 pound of weight, e.g., from 0% to 5%, from 0% to 1%, or from 0% to 0.1%. In terms of lower limits, the anti-fog composition may have a haze Δ less than 10%, e.g., less than 5%, less than 1% or less than 0.1%.

In one embodiment, the anti-fog composition has a moisture (water) vapor transmission rate (MVTR) ranging from 100 g/m$^2$/day to 1000 g/m$^2$/day (at 25° C. and 75% relative humidity), e.g., from 200 g/m$^2$/day to 1000 g/m$^2$/day or from 250 g/m$^2$/day to 750 g/m$^2$/day. In terms of lower limits, the anti-fog composition may have a water vapor transmission rate greater than 100 g/m$^2$/day, e.g., greater than 200 g/m$^2$/day, or greater than 250 g/m$^2$/day. In terms of upper limits, the anti-fog composition may have a water vapor transmission rate less than 1000 g/m$^2$/day, e.g., less than 900 g/m$^2$/day, or less than 750 g/m$^2$/day. Water vapor transmission rate may be measured by gravimetric techniques. In one embodiment, the water vapor transmission rate is measured as noted in one of the following ASTM test standards: ASTM F1249-06, ASTM E398-03, ASTM D1434, ASTM D3079, ASTM D4279, ASTM E96, ASTM E398, ASTM F1249, ASTM F2298, or ASTM F2622.

In one embodiment, the anti-fog composition has a transparency ranging from 40% to 100%, as measured by ASTM D1746, e.g., from 70% to 90%. In terms of lower limits, the anti-fog composition may have a transparency greater than 40%, e.g., greater than 70%. In terms of upper limits, the anti-fog composition may have a transparency less than 100%, e.g., less than 90%.

In one embodiment, the anti-fog composition has a light diffusion ranging from 0.1 cd/m$^2$/lx to 0.26 cd/m$^2$/lx as measured by EN 167 4, e.g., from 0.15 cd/m$^2$/lx to 0.25 cd/m$^2$/lx. In terms of lower limits, the anti-fog composition may have a light diffusion greater than 0.1 cd/m$^2$/lx, e.g., greater than 0.15 cd/m$^2$/lx. In terms of lower limits, the anti-fog composition may have a light diffusion less than 0.26 cd/m$^2$/lx e.g., less than 0.25 cd/m$^2$/lx.

In one embodiment, the anti-fog composition has a gloss ranging from 100 to 200 as measured by ASTM D5423, e.g., from 125 to 175, or from 145 to 155. In terms of lower limits, the anti-fog composition may have a light diffusion greater than 100, e.g., greater than 125 or greater than 145. In terms of upper limits, the anti-fog composition may have a light diffusion less than 200 e.g., less than 175 or less than 155.

In one embodiment, the anti-fog composition has a tensile strength ranging from 40 Nmm$^{-2}$ to 140 Nmm$^{-2}$, as measured by ASTM D882, e.g., from 70 Nmm$^{-2}$ to 110 Nmm$^{-2}$. In terms of lower limits, the anti-fog composition may have a tensile strength greater than 40 Nmm$^{-2}$, e.g., greater than 70 Nmm$^{-2}$. In terms of upper limits, the anti-fog composition may have a tensile strength less than 140 Nmm$^{-2}$, e.g., less than 90 Nmm$^{-2}$.

In one embodiment, the anti-fog composition has an elongation ranging from 20% to 60%, as measured by ASTM D882, e.g., from 25% to 55%. In terms of lower limits, the anti-fog composition may have an elongation greater than 20%, e.g., greater than 25%. In terms of upper limits, the anti-fog composition may have an elongation less than 60%, e.g., less than 55%.

In one embodiment, the anti-fog composition has a Young's modulus ranging from 1400 Nmm$^{-2}$ to 2400 Nmm$^{-2}$, as measured by ASTM D882, e.g., from 1600 Nmm$^{-2}$ to 2200 Nmm$^{-2}$, or from 1800 Nmm$^{-2}$ to 2000 Nmm$^{-2}$. In terms of lower limits, the anti-fog composition may have a Young's modulus greater than 1400 Nmm$^{-2}$, e.g., greater than 1600 Nmm$^{-2}$, or greater than 1800 Nmm$^{-2}$. In terms of upper limits, the anti-fog composition may have a Young's modulus less than 2400 Nmm$^{-2}$, e.g., less than 2200 Nmm$^{-2}$ or less than 2000 Nmm$^{-2}$.

The dimensions of the primary film may vary widely. In one embodiment, the primary film has a thickness ranging from 25 microns to 2000 microns, e.g., from 25 microns to 1000 microns, from 25 microns to 750 microns, from 50 microns to 500 microns, or from 75 microns to 200 microns. In terms of lower limits, the thickness of the primary film may be greater than 25 microns, e.g., greater than 50 microns or greater than 75 microns. In terms of upper limits, the thickness of the primary film may be less than 2000 microns, e.g., less than 1000 microns, less than 750 microns, less than 500 microns, or less than 200 microns. Thicknesses may be measured via the methods known in the art, e.g., infrared scanning.

Multi-Layer Configurations

The configuration and/or dimensions of the anti-fog compositions also may vary widely. In some cases, the anti-fog composition may comprise one layer, i.e., the above-described primary film. In other embodiments, the anti-fog composition may comprise multiple layers, e.g., 2 or more layers, 3 or more layers, 4 or more layers or 5 or more layers. In this aspect, the thickness of the anti-fog composition (including all layers) may range from 200 microns to 2000 microns, e.g., from 200 microns to 1000 microns, from 250 microns to 750 microns, or from 275 microns to 500 microns. In terms of lower limits, the thickness of the anti-fog composition may be greater than 200 microns, e.g., greater than 250 microns or greater than 275 microns. In terms of upper limits, the thickness of the anti-fog composition may be less than 2000 microns, e.g., less than 1000 microns, less than 750 microns, less than 500 microns, or less than 200 microns. In embodiments in which multiple layers are employed, the layers may be adhered to one another, e.g., laminated or attached to one another, optionally with an adhesive. The term "adhered" broadly encompasses any method used to connect multiple layers and may or may not involve the use of a separate adhesive. In one embodiment, adhering may be achieved by contacting the layers with acetone and stacking the contacted layers, preferably before caustic treatment, to form a bond between the layers. In other embodiments, especially where greater thickness is preferred, an adhesive may be employed to adhere the layers to one another. Various adhesives are known in the art. In one embodiment, the primary film (and the anti-fog composition as a whole) may be in the form of a rolled sheet.

In one embodiment, the anti-fog composition further comprises a protective film. The protective film may be adhered to at least one of the major planar surfaces. In some cases, the protective film may be adhered to only one major planar surface. The protective film may be a fairly low tack film that protects the anti-fog composition, e.g., the surface thereof, from damage, e.g., physical, light-related, or chemical damage. In use, the protective film may be peeled away from the anti-fog composition, optionally after application to a suitable substrate. The specific composition of the protective film may vary widely. In some embodiments, the protective film comprises a protective material selected from polyesters, polyethylenes, and polyethylene terephthalate.

The protective film may be adhered to at least one of the major planar surfaces with a suitable adhesive, e.g., an acrylic polymer.

In some cases, the anti-fog composition comprises an adhesive layer attached to one major planar surface. In one embodiment, the anti-fog composition comprises an adhesive layer adhered to one major planar surface and a protective layer attached, e.g., adhered, to the other major planar surface. The adhesive layer may then have a release film attached thereto. The anti-fog composition may be in the form of a flat sheet or rolled sheet.

In some configurations, the anti-fog composition comprises the primary film and a secondary film. The secondary film may be adhered to the primary film. In one embodiment, the secondary film has substantially the same composition as the primary film. This configuration may be useful when a greater thickness and a uniform composition are desired. In one embodiment, multiple precursor layers may be formed and then stacked upon one another, e.g., to achieve a thicker precursor film. The stacked precursor film may then be treated with caustic solution.

In one embodiment, the secondary film has a composition different from the primary film. This configuration may be useful when a larger thickness is desired, but a uniform composition is not necessary, e.g., when only the surface of the film requires anti-fog characteristics, and the central or middle region does not require anti-fog characteristics. For example, the secondary film may comprise cellulose acetate, and the cellulose acetate in the secondary film may have a degree of substitution greater than that of the primary film, e.g., outer major planar surface of the primary film, which preferably has a degree of substitution as discussed herein. For example, the secondary film may not be saponified and the primary film may be saponified. Such a configuration may provide cost advantages and allow for the building up of thick films or sheets having the desired anti-fog characteristics on the exterior major planar surface of the anti-fog composition. In one embodiment, the anti-fog composition employs the primary film (with anti-fog characteristics) on one side of the composition and a secondary layer that does not have anti-fog characteristics. Such a configuration may be useful in cases where the end substrate is used in colder temperatures, e.g., ski/skydiving goggles, airplane windows.

In some embodiments, one or more films are utilized in conjunction with the primary film. Suitable adhesives, e.g., ethylene-vinyl acetate adhesives, may be utilized to attach the primary film to the additional film(s). Many film layers can be utilized, e.g., more than 3, more than 4, or more than 5. In some embodiments, as noted above, acetone can be contacted with the primary film and/or to one or more additional films to adhere the layers to one another. This addition of acetone and adhering of the films may be implemented before saponification of the precursor film. In cases where the layers have been saponified, it may be beneficial to utilize an adhesive to adhere the layers to one another.

In one embodiment, the invention relates to a multi-layer anti-fog composition. The multi-layer anti-fog composition comprises a primary film as discussed herein. The primary film comprises cellulose acetate having a first degree of substitution. The first degree of substitution may be less than 2.55, e.g., less than 2.5, less than 2.0, or less than 1.5. Other ranges discussed herein also apply to multi-layer configurations. The multi-layer anti-fog composition also comprises a secondary film. One of the major planar surfaces of the secondary film is adhered, optionally with an adhesive, to one of the major planar surfaces of the primary film. The composition of the secondary film may vary widely. In some embodiments, the secondary film may be a polymer film, e.g., a polycarbonate film or a polyester film. In one embodiment, the secondary film may comprise cellulose acetate, optionally non-saponified cellulose acetate. In some of these cases, the secondary film comprising cellulose acetate has a second degree of substitution greater than the first degree of substitution. In one embodiment, the multi-layer anti-fog composition further comprises an additional anti-fog film adhered to the other of the opposing major planar surfaces of the secondary film. In this case, the multi-layer anti-fog composition would comprise a standard, preferably non-saponified, film sandwiched between two saponified films, e.g., the additional film has opposing major planar surfaces and a central coplanar region disposed between the opposing major planar surfaces and one of the opposing major surfaces is adhered to the other of the opposing major planar surfaces of the secondary film. In one aspect of this embodiment, the additional film comprises cellulose acetate having a degree of substitution less than that of the secondary film. The secondary film is not limited to cellulose acetate films. For example, the secondary film may be a non-saponified polycarbonate or polyester film. In this case, the multi-layer anti-fog composition would comprise a standard polymer film, e.g., a polycarbonate or polyester film, sandwiched by two saponified (cellulose acetate-containing) films. In some embodiments, multiple non-saponified secondary films, of same or different composition, may be adhered together, with or without adhesive, and the resulting multi-layer structure may be sandwiched between the above-described primary film and the above-described additional film.

Main Precursor Film Components

Cellulose is generally known to be a semi-synthetic polymer containing anhydroglucose repeating units with three hydroxyl groups per anhydroglucose unit. Cellulose acetate may be formed by esterifying cellulose after activating the cellulose with acetic acid. The cellulose may be obtained from numerous types of cellulosic material, including but not limited to plant derived biomass, corn stover, sugar cane stalk, bagasse and cane residues, rice and wheat straw, agricultural grasses, hardwood, hardwood pulp, softwood, softwood pulp, cotton linters, switchgrass, bagasse, herbs, recycled paper, waste paper, wood chips, pulp and paper wastes, waste wood, thinned wood, willow, poplar, perennial grasses (e.g., grasses of the Miscanthus family), bacterial cellulose, seed hulls (e.g., soy beans), cornstalk, chaff, and other forms of wood, bamboo, soyhull, bast fibers, such as kenaf, hemp, jute and flax, agricultural residual products, agricultural wastes, excretions of livestock, microbial, algal cellulose, seaweed and all other materials proximately or ultimately derived from plants. Such cellulosic raw materials are preferably processed in pellet, chip, clip, sheet, attritioned fiber, powder form, or other form rendering them suitable for further purification. Combinations of sources are also within the contemplation of the invention.

Cellulose esters suitable for use in producing the anti-fog composition of the present invention may, in some embodiments, have ester substituents that include, but are not limited to, $C_1$-$C_{20}$ aliphatic esters (e.g., acetate, propionate, or butyrate), functional $C_1$-$C_{20}$ aliphatic esters (e.g., succinate, glutarate, maleate) aromatic esters (e.g., benzoate or phthalate), substituted aromatic esters, and the like, any derivative thereof, and any combination thereof. Cellulose esters suitable for use in producing the anti-fog composition of the present invention may, in some embodiments, have a molecular weight ranging from a lower limit of about 10,000, 15,000, 25,000, 50,000, or 85,000 to an upper limit of about 125,000, 100,000, or 85,000, and wherein the molecular weight may range from any lower limit to any upper limit and encompass any subset therebetween. In one embodiment, the number average molecular weight of the cellulose acetate may range from 40,000 amu to 100,000 amu, e.g., from 50,000 amu to 80,000 amu.

The cellulose acetate used in the production of the anti-fog composition may be cellulose diacetate or cellulose triacetate. In one embodiment, the cellulose acetate comprises cellulose diacetate. Cellulose acetate has an acetyl value, which is a measure of the degree of substitution of the cellulose acetate. The acetyl value represents the weight percent of acetic acid liberated by the saponification of cellulose acetate. The acetyl value and degree of substitution are linearly related. The degree of substitution may be calculated from the acetyl value according to the following formula:

$$\text{Degree of substitution} = \frac{\text{Acetyl value} \times 162}{6005 - (\text{Acetyl value} \times 42)}$$

In the production of the anti-fog composition various solvents and adhesives may be used as bonding agents to bond continuous film layers together and to bond opposing cellulose acetate layers together. The solubility and, hence, bonding ability of cellulose acetate in a solvent depends, at least in part, on the acetyl value of the cellulose acetate. As the acetyl value decreases, solubility of the cellulose acetate may improve in ketones, esters, nitrogen-containing compounds, glycols and ethers. As the acetyl value increases, solubility of the cellulose acetate may improve in halogenated hydrocarbons. As a result, the acetyl value and degree of substitution of the cellulose acetate employed as well as the desired bonding agent for bonding the continuous film layers may impact the ability to form durable and mechanically uniform anti-fog compositions.

The cellulose acetate may be utilized in powder or flake form, preferably flake form, to form the dope used in a solvent casting process to form the precursor film. In other embodiments, the cellulose acetate, in powder or flake form, may be formulated and injection molded into pellets that may be extruded into the precursor film.

The flake form of cellulose acetate may have an average flake size from 5 μm to 10 mm, as determined by sieve analysis. The flake preferably has low moisture content, optionally comprising less than 6 wt % water, e.g., less than 5 wt % water or less than 2.5 wt % water. In terms of ranges, the flake form may have from 0.01 to 6 wt % water, e.g., from 0.1 to 2.5 wt % water or from 0.5 to 2.45 wt % water. Prior to mixing, the cellulose acetate flake may be heated to remove moisture. In some embodiments, the cellulose acetate flake may be dried until it has a water content of less than 2 wt. %, e.g., less than 1.5 wt. %, less than 1 wt. % or less than 0.2 wt. %, The drying may be conducted at a temperature from 30 to 100° C., e.g., from 50 to 80° C. and for a period of 1 to 24 hours, e.g., from 5 to 20 hours or from 10 to 15 hours.

The plasticizer may vary widely. Suitable plasticizers may, in some embodiments, include, but are not limited to, triacetin, trimethyl phosphate, triethyl phosphate, tributyl phosphate, triphenyl phosphate, triethyl citrate, acetyl trimethyl citrate, acetyl triethyl citrate, acetyl tributyl citrate, dibutyl phthalate, diaryl phthalate, diethyl phthalate, dimethyl phthalate, di-2-methoxyethyl phthalate, di-octyl phthalate (and isomers), dibutyl tartrate, ethyl o-benzoylbenzoate, ethyl phthalyl ethyl glycolate, methyl phthalyl ethyl glycolate, n-ethyltoluenesulfonamide, o-cresyl p-toluenesulfonate, aromatic diol, substituted aromatic diols, aromatic ethers, tripropionin, polycaprolactone, glycerin, glycerin esters, diacetin, polyethylene glycol, polyethylene glycol esters, polyethylene glycol diesters, di-2-ethylhexyl polyethylene glycol ester, diethylene glycol, polypropylene glycol, polyglycoldiglycidyl ethers, dimethyl sulfoxide, N-methyl pyrollidinone, propylene carbonate, $C_1$-$C_{20}$ diacid esters, dimethyl adipate (and other dialkyl esters), resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, alkylphosphate esters, phospholipids, aromas (including some described herein, e.g., eugenol, cinnamyl alcohol, camphor, methoxy hydroxy acetophenone (acetovanillone), vanillin, and ethylvanillin), and the like, any derivative thereof, and any combination thereof. In some embodiments, plasticizers may be food-grade plasticizers. Examples of food-grade plasticizers may, in some embodiments, include, but are not limited to, triacetin, trimethyl citrate, triethyl citrate, tributyl citrate, eugenol, cinnamyl alcohol, methoxy hydroxy acetophenone (acetovanillone), vanillin, ethylvanillin, polyethylene glycols, and the like, and any combination thereof.

In one embodiment, the plasticizer is selected from the group consisting of 1,2,3-triacetoxypropane (triacetin), tributyl citrate, diethyl phthalate, triethyl citrate, triphenyl phosphate, tris(clorisopropyl)phosphate, dimethyl phthalate, bornan-2-one, PEG-DGE, PPG-DGE, tributyl phosphate, and combinations thereof. In one embodiment the plasticizer comprises a phthalate plasticizer. In preferred embodiments, the plasticizer comprises diethyl phthalate. In some embodiments, the anti-fog composition comprises, inter alia, diethyl phthalate and silica having an average particle size ranging from 0.02 microns to 6 microns. In one embodiment, the plasticizer does not comprise triacetin.

The anti-blocking agent may vary widely, as long as the physical size range is maintained. In preferred embodiments, the anti-blocking agent comprises an inorganic compound. For example, the anti-blocking agent may comprise oxides, carbonates, talc, clay, kaolin, silicates, and/or phosphates. In one embodiment, the anti-blocking agent may be selected from the group consisting of titanium dioxide, aluminum oxide, zirconium oxide, silicon dioxide, calcium carbonate, calcium silicate, aluminum silicate, magnesium silicate, calcium phosphate and mixtures thereof. In one embodiment, the anti-blocking agent comprises silica. Some suitable commercial products include Aerosil® products (from Evonik Industries AG, Germany). One specific suitable commercial product is Aerosil R972.

Optional Additives

In some embodiments, the anti-fog composition, and the dope preferably used to form the anti-fog composition, may further comprise one or more additional additives, e.g., tackifiers, flame retardants, antioxidants, antibacterial agents, antifungal agents, colorants, pigments, dyes, UV-stabilizers, viscosity modifiers, processing additives, aromas, and the like, and any combination thereof. The amount of the additives may vary widely. Generally speaking the one or more additives may be present in an amount ranging from 0.01 to 10 wt. %, based on the total weight of the anti-fog composition, e.g., from 0.03 to 2 wt. %, or from 0.1 to 1 wt. %.

In one embodiment, UV absorber additives may be included in the anti-fog composition. For example, the anti-fog composition (with a UV absorber additive) may be utilized in a situation where UV light may damage the contents enclosed by the anti-fog composition. One example may include a refrigerator or freezer in which the anti-fog composition (with a UV absorber additive) is utilized to protect meat or fish from potentially damaging UV light.

Tackifiers may, in some embodiments, increase the adhesive properties of the anti-fog composition described herein. Tackifiers suitable for use in conjunction with the anti-fog composition described herein may, in some embodiments, include, but are not limited to, methylcellulose, ethylcellulose, hydroxyethylcellulose, carboxy methylcellulose, carboxy ethylcellulose, amides, diamines, polyesters, polycarbonates, silyl-modified polyamide compounds, polycarbamates, urethanes, natural resins, natural rosins, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly(butyl acrylate), poly(2-ethylhexyl acrylate), acrylic acid ester co-polymers, methacrylic acid derivative polymers, methacrylic acid homopolymers, methacrylic acid ester homopolymers, poly(methyl methacrylate), poly(butyl methacrylate), poly(2-ethylhexyl methacrylate), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, benzyl coco di-(hydroxyethyl) quaternary amines, p-T-amyl-phenols condensed with formaldehyde, dialkyl amino alkyl(meth)acrylates, acrylamides, N-(dialkyl amino alkyl) acrylamide, methacrylamides, hydroxy alkyl(meth)acrylates, methacrylic acids, acrylic acids, hydroxyethyl acrylates, and the like, any derivative thereof, and any combination thereof.

In some embodiments, tackifiers suitable for use in conjunction with the anti-fog composition described herein may be food-grade tackifiers. Examples of food-grade tackifiers may, in some embodiments, include, but are not limited to, methylcellulose, ethylcellulose, hydroxyethylcellulose, carboxy methylcellulose, carboxy ethylcellulose, natural resins, natural rosins, and the like, and any combination thereof.

Flame retardants suitable for use in conjunction with the anti-fog composition described herein may, in some embodiments, include, but are not limited to, phosphates, catechol phosphates, resorcinol phosphates, aromatic polyhalides, and the like, and any combination thereof.

Antifungal agents suitable for use in conjunction with the anti-fog composition described herein may, in some embodiments, include, but are not limited to, polyene antifungals, e.g., natamycin, rimocidin, filipin, nystatin, amphotericin B, candicin, and hamycin, imidazole antifungals such as miconazole (available as MICATIN® from WellSpring Pharmaceutical Corporation), ketoconazole (commercially available as NIZORAL® from McNeil consumer Healthcare), clotrimazole (commercially available as LOTRAMIN® and LOTRAMIN AF® available from Merck and CANESTEN® available from Bayer), econazole, omoconazole, bifonazole, butoconazole, fenticonazole, isoconazole, oxiconazole, sertaconazole (commercially available as ERTACZO® from OrthoDematologics), sulconazole, and tioconazole; triazole antifungals such as fluconazole, itraconazole, isavuconazole, ravuconazole, posaconazole, voriconazole, terconazole, and albaconazole), thiazole antifungals (e.g., abafungin), allylamine antifungals (e.g., terbinafine (commercially available as LAMISIL® from Novartis Consumer Health, Inc.), naftifine (commercially available as NAFTIN® available from Merz Pharmaceuticals), and butenafine (commercially available as LOTRAMIN ULTRA® from Merck), echinocandin antifungals (e.g., anidulafungin, caspofungin, and micafungin), polygodial, benzoic acid, ciclopirox, tolnaftate (e.g., commercially available as TINACTIN® from MDS Consumer Care, Inc.), undecylenic acid, flucytosine, 5-fluorocytosine, griseofulvin, haloprogin, and any combination thereof.

Colorants, pigments, and dyes suitable for use in conjunction with the anti-fog composition described herein may, in some embodiments, include, but are not limited to, plant dyes, vegetable dyes, titanium dioxide, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, nickel titanate, benzimidazolone orange gl, solvent orange 60, orange dyes, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL Brilliant Yellow K-6G liquid, CARTASOL Yellow K-4GL liquid, CARTASOL Yellow K-GL liquid, CARTASOL Orange K-3GL liquid, CARTASOL Scarlet K-2GL liquid, CARTASOL Red K-3BN liquid, CARTASOL Blue K-5R liquid, CARTASOL Blue K-RL liquid, CARTASOL Turquoise K-RL liquid/granules, CARTASOL Brown K-BL liquid), FASTUSOL® dyes (an auxochrome, available from BASF) (e.g., Yellow 3GL, Fastusol C Blue 74L), and the like, any derivative thereof, and any combination thereof. In some embodiments, when the colorant is titanium dioxide is utilized as the colorant, the titanium dioxide may also function to increase the stiffness of the film. In one embodiment, solvent dyes may be employed.

In some embodiments, colorants, pigments and dyes suitable for use in conjunction with the anti-fog composition described herein may be food-grade pigments and dyes. Examples of food-grade pigments and dyes may, in some embodiments, include, but are not limited to, plant dyes, vegetable dyes, and the like, and any combination thereof.

Aroma agents, e.g., fragrances, suitable for use in conjunction with the anti-fog composition described herein may, in some embodiments, include, but are not limited to, spices, spice extracts, herb extracts, essential oils, smelling salts, volatile organic compounds, volatile small molecules, methyl formate, methyl acetate, methyl butyrate, ethyl acetate, ethyl butyrate, isoamyl acetate, pentyl butyrate, pentyl pentanoate, octyl acetate, myrcene, geraniol, nerol, citral, citronellal, citronellol, linalool, nerolidol, limonene, camphor, terpineol, alpha-ionone, thujone, benzaldehyde, eugenol, isoeugenol, cinnamaldehyde, ethyl maltol, vanilla, vannillin, cinnamyl alcohol, anisole, anethole, estragole, thymol, furaneol, methanol, rosemary, lavender, citrus, freesia, apricot blossoms, greens, peach, jasmine, rosewood, pine, thyme, oakmoss, musk, vetiver, myrrh, blackcurrant, bergamot, grapefruit, acacia, passiflora, sandalwood, tonka bean, mandarin, neroli, violet leaves, gardenia, red fruits, ylang-ylang, acacia farnesiana, mimosa, tonka bean, woods, ambergris, daffodil, hyacinth, narcissus, black currant bud, iris, raspberry, lily of the valley, sandalwood, vetiver, cedarwood, neroli, bergamot, strawberry, carnation, oregano, honey, civet, heliotrope, caramel, coumarin, patchouli, dewberry, helonial, bergamot, hyacinth, coriander, pimento berry, labdanum, cassie, bergamot, aldehydes, orchid, amber, benzoin, orris, tuberose, palmarosa, cinnamon, nutmeg, moss, styrax, pineapple, bergamot, foxglove, tulip, wisteria, clematis, ambergris, gums, resins, civet, peach, plum, castoreum, civet, myrrh, geranium, rose violet, jonquil, spicy carnation, galbanum, hyacinth, petitgrain, iris, hyacinth, honeysuckle, pepper, raspberry, benzoin, mango, coconut, hesperides, castoreum, osmanthus, mousse de chene, nectarine, mint, anise, cinnamon, orris, apricot, plumeria, marigold, rose otto, narcissus, tolu balsam, frankincense, amber, orange blossom, bourbon vetiver, opopanax, white musk, papaya, sugar candy, jackfruit, honeydew, lotus blossom, muguet, mulberry, absinthe, ginger, juniper berries, spicebush, peony, violet, lemon, lime, hibiscus, white rum, basil, lavender, balsamics, fo-ti-tieng, osmanthus, karo karunde, white orchid, calla lilies, white rose, rhubrum lily, tagetes, ambergris, ivy, grass, seringa, spearmint, clary sage, cottonwood, grapes, brimbelle, lotus, cyclamen, orchid, glycine, tiare flower, ginger lily, green osmanthus, passion flower, blue rose, bay rum, cassie, African tagetes, Anatolian rose, Auvergne narcissus, British broom, British broom chocolate, Bulgarian rose, Chinese patchouli, Chinese gardenia, Calabrian mandarin, Comoros Island tuberose, Ceylonese cardamom, Caribbean passion fruit, Damascena rose, Georgia peach, white Madonna lily, Egyptian jasmine, Egyptian marigold, Ethiopian civet, Farnesian cassie, Florentine iris, French jasmine, French jonquil, French hyacinth, Guinea oranges, Guyana wacapua, Grasse petitgrain, Grasse rose, Grasse tuberose, Haitian vetiver, Hawaiian pineapple, Israeli basil, Indian sandalwood, Indian Ocean vanilla, Italian bergamot, Italian iris, Jamaican pepper, May rose, Madagascar ylang-ylang, Madagascar vanilla, Moroccan jasmine, Moroccan rose, Moroccan oakmoss, Moroccan orange blossom, Mysore sandalwood, Oriental rose, Russian leather, Russian coriander, Sicilian mandarin, South African marigold, South American tonka bean, Singapore patchouli, Spanish orange blossom, Sicilian lime, Reunion Island vetiver, Turkish rose, Thai benzoin, Tunisian orange blossom, Yugoslavian oakmoss, Virginian cedarwood, Utah yarrow, West Indian rosewood, and the like, and any combination thereof.

Process for Producing the Anti-Fog Composition

In one embodiment, the invention relates to a process for producing the anti-fog composition disclosed herein. The process comprises the step of combining cellulose acetate, a plasticizer, an anti-blocking agent, e.g., an anti-blocking agent having an average particle size ranging from 0.02 microns to 6 microns, and solvent to form a dope, and casting, e.g., solvent casting, the dope to form the precursor film. The process further comprises the step of contacting the precursor film with a caustic solution to form a treated film. In one embodiment, the treatment of the precursor film serves to partially or completely saponify the precursor film, thus creating the desired (uniform or non-uniform) degree of substitution, as discussed herein. The process further comprises the steps of washing the treated film to form a washed film and drying the washed film to form the primary film. The washing, in some embodiments, inhibits or eliminates the formation of salts on the surface of the treated film. In one embodiment, the drying is achieved via oven drying. In one embodiment, the drying is achieved simply via air drying.

In one embodiment, the process comprises the step of combining cellulose acetate, a plasticizer, and acetone to form the dope and casting, e.g., solvent casting, the dope to form the precursor film. The resultant primary film may comprise acetone, e.g., from 0.01 wt % to 3 wt % acetone. In such embodiments, the primary film may not necessarily comprise anti-blocking agent having an average particle size ranging from 0.02 microns to 6 microns. This option is, of course, possible however.

Processes for preparing cellulose acetate films have been described in U.S. Pat. Nos. 2,232,012 and 3,528,833, the entireties of which are incorporated by reference herein. In general, the solvent casting process comprises casting a mixture comprising plasticizer, anti-blocking agent, and cellulose acetate dissolved in a solvent, e.g., acetone. The components of the mixture and the respective amounts determine the characteristics of the primary film, which is discussed herein.

In one embodiment, the mixture (dope) may be prepared by dissolving cellulose acetate in a solvent. In some embodiments, the solvent is acetone. In one embodiment the solvent is selected from the group consisting of ethyl lactate methyl ethyl ketone, and dichlormethane. To improve the solubility of cellulose acetate in acetone, the cellulose acetate and acetone are preferably continuously added to a first mixer. The mixture may then be sent to a second and/or third mixer to allow for full dissolution of the cellulose acetate in the acetone. The mixers may be continuous mixers that are used in series. It is understood that in some embodiments, one mixer may be sufficient to achieve cellulose acetate dissolution. In other embodiments, two, three, or more mixers (e.g., four mixers, five mixers, or greater than five mixers) may be used in series or in parallel. In yet other embodiments, the cellulose acetate, solvent, and other additives may be combined in one or more blenders, without the use of any mixers.

The mixture may further comprise a processing additive. Additionally, the mixture may comprise a colorant. The plasticizer may be added directly to the first mixer or may be blended with at least a portion of the solvent and then added to the first mixer. Similarly, the colorant, anti-blocking agent and/or processing additive may be added directly to the first mixer or may be combined with a portion of the solvent and then added to the first mixer.

Once the cellulose acetate has been dissolved in the acetone solvent, the mixture may be referred to as dope. The dope may then be filtered to remove impurities. In some embodiments, the filtering is a two-stage filtration.

In embodiments in which the dope is solution cast, the cellulose acetate is generally used in flake form. The (flake) cellulose acetate may then be dissolved in acetone to form an acetone dope. Additional components, including the plasticizers and the anti-blocking agent may be included with the acetone dope. The acetone dope may also comprise one or more of anti-blocking agents, stearic acid, dyes and/or one or more specialty chemicals. The components are then mixed as described above. The resultant mixture may then be filtered. The mixture then may be cast into a continuous film by die extrusion. The film may be dried in a warm air drying cabinet comprising rollers.

In one embodiment, after forming a mixture comprising cellulose acetate, plasticizer, and optional additives, the mixture may be melt extruded in a film die to form a sheet or melt extruded in a small hole die to form filaments which are then sent to a pelletizer to form pellets. The melt extrusion may be performed at a temperature of up to 230° C., e.g., up to 220° C. or up to 210° C. A temperature greater than 230° C. may lead to destabilization of the mixture components, particularly of the cellulose acetate. The melt extruder may be a twin screw feeder with co-rotating screws, and may be operated at a screw speed from 100 to 500 rpm, e.g., from 150 to 450 rpm, or from 250 to 350 rpm. The sheet may have a thickness between 0.5 and 0.6 mm, e.g., from 0.53 to 0.54 mm.

In one embodiment, the precursor film is formed via a melt extrusion process. The process for producing an anti-fog composition comprising a primary film may comprise the step of extruding pellets comprising cellulose acetate, a plasticizer, and optionally an anti-blocking agent. The anti-blocking agent, if utilized, may have an average particle size as discussed herein. In one embodiment, the anti-blocking agent is employed when the desired thickness of the precursor film is less than 300 microns, e.g., less than 200 microns. The pellets may further comprise an antioxidant and/or a heat stabilizer. The process further comprises the step of contacting the precursor film with a caustic solution to form a treated film. The process may further comprise the step(s) of washing the treated film to form a washed film and/or drying the washed film to form the primary film.

One method to reduce the melting temperature of the cellulose acetate is to form a mixture comprising a plasticizer and the cellulose acetate prior to melt extrusion or solvent casting. In some embodiments, at least one additive may also be mixed with the plasticizer and cellulose acetate to form the pellet mixture. The cellulose acetate may be present in an amount from 75 to 98 wt. % of the mixture, e.g., from 80 to 97.5 wt. % or from 85 to 95 wt. %. Weight percentages are based on the total weight of the mixture, which includes the weight of the cellulose acetate, the plasticizer, and any additives included in the mixture. As noted above, the cellulose acetate may be provided as a flake or as a powder.

The pellet mixture may be formed by combining cellulose acetate, in flake or powder form, with plasticizer in a high speed mixer. In some embodiments, the plasticizer may be combined with the cellulose acetate using a spray distribution system during the mixing step. In other embodiments, the plasticizer may be added to the cellulose acetate during the mixing step, either continuously or intermittently. In some embodiments, the flake form of cellulose acetate is preferred. If included in the mixture, the additives may be combined with the cellulose acetate and plasticizer during the mixing step. In some embodiments, the high speed mixer may be may be operated for 1 to 2 minutes. In some embodiments, a base mixture may be prepared and the base mixture may then be adjusted to obtain with additional plasticizer and/or additives.

In some embodiments when an extrusion process is utilized to form the precursor film, antioxidants may, in some embodiments, mitigate oxidation and/or chemical degradation of the anti-fog composition described herein during storage, transportation, and/or implementation. Antioxidants suitable for use in conjunction with the anti-fog composition described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, ubiquinol, gallic acids, melatonin, secondary aromatic amines, benzofuranones, hindered phenols, polyphenols, hindered amines, organophosphorus compounds, thioesters, benzoates, lactones, hydroxylamines, and the like, and any combination thereof. In one embodiment, the antioxidant may be selected from the group consisting of stearyl 3-(3,5-di-tert-butyl-4-hydroxyphenyl) propionate, bis(2,4-dicumylphenyl)pentaerythritol diphosphite, tris(2,4-di-tert-butylphenyl)phosphite, bisphenol A propoxylate diglycidyl ether, 9,10-dihydroxy-9-oxa-10-phosphaphenanthrene-10-oxide and combinations thereof.

In some embodiments, antioxidants suitable for use in conjunction with the anti-fog composition described herein may be food-grade antioxidants. Examples of food-grade antioxidants may, in some embodiments, include, but are not limited to, ascorbic acid, vitamin A, tocopherols, and the like, and any combination thereof.

In some melt extrusion-related embodiments, viscosity modifiers are employed. Viscosity modifiers suitable for use in conjunction with the anti-fog composition described herein may, in some embodiments, include, but are not limited to, polyethylene glycols, and the like, and any combination thereof, which, in some embodiments, may be a food-grade viscosity modifier.

The caustic treatment may be achieved via a wide variety of methods. An exemplary method is alkali saponification treatment. For example, see International Patent Application No. WO 2008/029801, which is incorporated herein by reference. The caustic treatment alters the degree of substitution of the precursor film, which, increases the hydrophilicity of the precursor film, and improves the anti-fog characteristics of the anti-fog composition. In one embodiment, the caustic treatment substitutes one or more of the acetyl groups of the cellulose acetate with another substituent, e.g., a hydroxyl group, a carbonyl group, or a carboxylic acid group.

In one embodiment, the precursor film is submerged in a bath of caustic solution. In another embodiment, the precursor film is bonded to one or more additional films, of the same or different composition, prior to treatment. As noted herein, multiple precursor layers may be formed and then stacked upon one another, e.g., to achieve a thicker precursor film. The stacked precursor film may then be treated with caustic solution.

The caustic solution may comprise any suitable alkali solution, many of which are known in the art. The caustic solution, in one embodiment, comprises an aqueous hydroxide solution. The caustic solution may comprise from 5 wt % to 20 wt % alkali solution, e.g., from 5 wt % to 15 wt % or from 7 wt % to 15 wt %. In some embodiments, the caustic solution comprises a potassium hydroxide solution present in the amounts discussed herein. The combination of the specific composition of the precursor film and the caustic treatment advantageously provides for the anti-fog composition having the features described herein, e.g., the ability absorb some water. In one embodiment, the caustic solution treatment step is conducted for a residence time ranging from 0.5 minutes to 20 minutes, e.g., from 2 minutes to 10 minutes. In terms of lower limits, the caustic solution treatment step may be conducted for a residence time greater than 0.5 minutes, e.g., greater than 2 minutes or greater than 5 minutes. In terms of upper limits, the caustic solution treatment step may be conducted for a residence time less than 20 minutes, e.g., less than 15 minutes or less than 10 minutes.

In one embodiment, the caustic solution treatment step is conducted at a temperature ranging from 40° C. to 100° C., e.g., from 45° C. to 75° C., or 50° C. to 70° C. Generally speaking, hotter treatment temperatures may result in faster saponification. Treatment temperature, in some cases, is inversely proportional to the duration of the treatment. In terms of lower limits, the caustic solution treatment step may be conducted at a temperature greater than 40° C., e.g., greater than 45° C., greater than 50° C., or greater than 65° C. In terms of upper limits, the caustic solution treatment step may be conducted at a temperature less than 100° C., e.g., less than 75° C., or less than 70° C.

The composition of the caustic solution may vary widely. In one embodiment, the molarity of the caustic solution is from 0.1M to 25M, e.g., from 0.1M to 17.5M, from 2M to 10M, or from 2M to 2.5M. Various combinations of processing conditions, e.g., residence time, temperature, molarity, and caustic solution composition, are contemplated. For example, in a preferred embodiment, the caustic solution comprises a 3M potassium hydroxide solution and the treatment is performed at 60° C. for 5 or 10 minutes. In another embodiment, the caustic solution comprises a 2.8M potassium hydroxide solution and the treatment is performed at 72.1° C. for 20 minutes.

In one embodiment, the process comprises the step of contacting the precursor film with acetone prior to saponifying. Without being bound by theory, contacting the cellulose acetate precursor film with acetone may open up the pores of the film, soften the surface of the film, and/or makes the film more porous, which advantageously provides for improved, faster saponification.

As noted above, the process further comprises the step of washing the treated film, e.g., with water. The washing step may be achieved by any suitable technique, many of which are known in the art. The washing step washes the surface of the treated film. In one embodiment, the washing is conducted at a temperature ranging from 0° C. to 50° C., e.g., from 20° C. to 40° C. or from 25° C. to 35° C. In terms of lower limits, the washing may be conducted at a temperature greater than 0° C., e.g., greater than 20° C., or greater than 25° C. In terms of upper limits, the washing may be conducted at a temperature less than 50° C., e.g., less than 40° C., or less than 35° C.

The process further comprises the step of drying the washed film to form the primary film. The drying step may be achieved by any suitable technique, many of which are known in the art. In one embodiment, the drying is achieved via oven drying. In one embodiment, the drying is achieved simply via air drying at ambient conditions. In one embodiment, the drying is conducted at a temperature ranging from 50° C. to 120° C., e.g., from 50° C. to 100° C. or from 60° C. to 80° C. In terms of lower limits, the drying may be conducted at a temperature greater than 50° C., e.g., greater than 55° C., or greater than 60° C. In terms of upper limits, the washing may be conducted at a temperature less than 120° C., e.g., less than 100° C., or less than 80° C.

In one embodiment, the invention relates to a process for producing a multi-layer anti-fog film composition. The process comprises the step of providing a first anti-fog film comprising cellulose acetate, a plasticizer, and an anti-blocking agent (as discussed herein). The process further comprises the steps of selecting a second film composition based on a first preferred characteristic; and adhering the first anti-fog film composition to the second film composition to form the multi-layer anti-fog film composition. The multi-layer anti-fog film composition has enhanced characteristics. In one embodiment, the first preferred characteristic is improved hydrophilicity. The second film may have a second characteristic that synergistically complements the hydrophilicity or vice versa. For example the second characteristic may be an anti-microbial characteristic. As another example, the second characteristic may be film tinting of coloring. In some embodiments, the preferred characteristic is selected such that the first anti-fog composition improves the preferred characteristic, e.g., creates a synergistic effect.

In one embodiment, the present invention relates to a consumer product composition comprising as one component thereof the anti-fog composition discussed herein. Thus, in some cases, the consumer product composition comprises a consumer product and the anti-fog composition. In one embodiment, the anti-fog composition will be attached to the consumer product. The methods for attachment will vary widely. In one embodiment, the consumer product will have a planar surface and the anti-fog composition will be disposed on, e.g., attached to, said planar surface.

The list of contemplated consumer products is vast. As one example, the consumer product may be selected from the group consisting of lenses, windows, screens, glass structures, containers, appliances, plastic, optical devices, and visors. In one embodiment, the consumer product is a refrigerating device, e.g., a refrigerator, a cooler, or a freezer. The anti-fog composition may be adhered to the consumer product, e.g., the planar surface of the consumer product, with an adhesive. Of course, the adhesive may vary widely and many suitable adhesives are known in the art.

Broadly speaking, any consumer product that has a potential for moisture interaction, e.g., humidity, fogging, dew accumulation, etc., may be a consumable product suitable for use with the anti-fog compositions of the present invention.

Examples of other consumer products include, but are not limited to, furniture or components thereof, e.g., carpet and/or fabric coated headboards, chairs, and stools, picture frames, self-adhesive window coverings, e.g., decorative window stickers, window films, and window tinting, light films, light filters, and the like.

In some embodiments, the consumer product includes bags, windows for boxes, wraps, camera lenses, windows, e.g., automotive windows, airplane windows, televisions, any product that utilizes a glass or protective glass, e.g., windows or balcony enclosures.

Suitable substrates or surfaces (of consumer products) for use with the anti-fog composition described herein may, in some embodiments, comprise materials that include, but are not limited to, ceramics, natural polymers, synthetic polymers, metals, natural materials, carbons, and the like, and any combination thereof. Examples of ceramics may, in some embodiments, include, but are not limited to, glass, quartz, silica, alumina, zirconia, carbide ceramics, boride ceramics, nitride ceramics, and the like, and any combination thereof. Examples of natural polymers may, in some embodiments, include, but are not limited to, cellulose, and the like, any derivative thereof, and any combination thereof. Examples of synthetic polymers may, in some embodiments, include, but are not limited to, cellulose diacetate, cellulose triacetate, synthetic bamboo, rayon, acrylic, aramid, nylon, polyolefins, polyethylene, polypropylene, polyesters, polyamides, zylon, and the like, any derivative thereof, and any combination thereof. Examples of metals may, in some embodiments, include, but are not limited to, steel, stainless steel, aluminum, copper, and the like, any alloy thereof, and any combination thereof. Examples of natural materials may, in some embodiments, include, but are not limited to, wood, grass, animal hide, and the like, and any combination thereof. Examples of carbons may, in some embodiments, include, but are not limited to, carbon fibers, and the like, any derivative thereof, and any combination thereof.

Additional examples of substrates suitable for use in conjunction with the articles described herein may, in some embodiments, include, but are not limited to, wood and/or grass derived substrates, e.g., wood veneers, particle board, fiberboard, medium-density fiberboard, high-density fiberboard, oriented strand board, cork, hardwoods, e.g., balsa wood, beech, ash, birch, Brazil wood, cherry, chestnut, elm, hickory, mahogany, maple, oak, rosewood, teak, walnut, locust, mango, alder, and the like, softwoods, e.g., pine, fir, spruce, cedar, hemlock, and the like, rough lumber, finished lumber, natural fibrous material, and bamboo, foam substrates, e.g., memory foams, polymer foams, polystyrene foam, polyurethane foam, frothed polyurethane, and soy-based foams, and the like, and any combination thereof.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The following embodiments are contemplated. All combinations of features and embodiments are contemplated.

Embodiment 1: An anti-fog composition, comprising a primary film having opposing major planar surfaces and a central coplanar region disposed between said opposing major planar surfaces, said primary film comprising cellulose acetate, plasticizer, and an anti-blocking agent having an average particle size ranging from 0.02 microns to 6 microns, wherein the cellulose acetate has a degree of substitution that increases from the opposing major planar surfaces toward the central coplanar region.

Embodiment 2: An anti-fog composition, comprising a primary film having opposing major planar surfaces and a central coplanar region disposed between said opposing major planar surfaces and comprising cellulose acetate, plasticizer, and an anti-blocking agent having an average particle size ranging from 0.02 microns to 6 microns, wherein the anti-fog composition has a fog time greater than 10 seconds, preferably greater than 20 seconds, more preferably greater than 30 seconds.

Embodiment 3: An anti-fog composition, comprising a primary film having opposing major planar surfaces and a central coplanar region disposed between said opposing major planar surfaces and comprising cellulose acetate, a plasticizer, and an anti-blocking agent, wherein the anti-fog composition has a fog time greater than 10 seconds, preferably greater than 20 seconds, more preferably greater than 30 seconds; wherein the anti-fog composition has a haze value ranging from 0.1% to 4.0%, preferably from 0.1% to 2.0%, as measured by ASTM D1003.

Embodiment 4: An anti-fog composition, comprising a primary film having opposing major planar surfaces and a central coplanar region disposed between said opposing major planar surfaces and comprising a mixture of:
cellulose acetate
a phthalate plasticizer; and
an anti-blocking agent having an average particle size ranging from 0.02 microns to 6 microns, wherein the anti-fog composition has a water vapor transmission rate greater than 100.

Embodiment 5: An anti-fog composition, comprising a primary film having opposing major planar surfaces and a central coplanar region disposed between said opposing major planar surfaces and comprising a mixture of cellulose acetate, diethyl phthalate, and an anti-blocking agent comprising silica and having an average particle diameter ranging from 0.02 microns to 6 microns, wherein the anti-fog composition has a fog time greater than 10 seconds, preferably greater than 20 seconds, more preferably greater than 30 seconds.

Embodiment 6: An anti-fog composition, comprising a primary film having a thickness, opposing major planar surfaces and a central coplanar region disposed between the opposing major planar surfaces, the primary film comprising cellulose acetate, plasticizer, and an anti-blocking agent having an average particle size less than 6 microns, wherein the degree of substitution throughout the thickness of the primary film is substantially uniform.

Embodiment 7: An anti-fog composition, comprising a primary film having opposing major planar surfaces and a central coplanar region disposed between said opposing major planar surfaces, said primary film comprising cellulose acetate, plasticizer, and from 0.01 wt % to 3 wt % acetone.

Embodiment 8: An anti-fog composition, comprising a primary film having opposing major planar surfaces and a central coplanar region disposed between said opposing major planar surfaces, said primary film comprising cellulose acetate, plasticizer, and an anti-blocking agent having an average particle size ranging from 0.02 microns to 6 microns.

Embodiment 9: The embodiment of any one of embodiments 1-5, 7 and 8, having a degree of substitution at the opposing major planar surfaces of about zero.

Embodiment 10: The embodiment of any one of embodiments 1-9, having a degree of substitution at the central coplanar region from 2.0 to 2.6, preferably from 2.2 to 2.55.

Embodiment 11: The embodiment of any one of embodiments 1-10, 51 and 52, having a fog time greater than 10 seconds, preferably greater than 20 seconds, more preferably greater than 30 seconds.

Embodiment 12: The embodiment of any one of embodiments 1-11, 51 and 52, having a haze value ranging from 0.1% to 4.0%, preferably from 0.1% to 2.0%, as measured by ASTM D1003.

Embodiment 13: The embodiment of any one of embodiments 1-3, 6-12, 51 and 52, wherein the plasticizer is selected from the group consisting of 1,2,3-triacetoxypropane (triacetin), tributyl citrate, triethyl citrate, triphenyl phosphate, tris(chlorisopropyl)phosphate, dimethyl phthalate, bornan-2-one, PEG-DGE, PPG-DGE, tributyl phosphate, and combinations thereof.

Embodiment 14: The embodiment of any one of embodiments 1-4, 6-13, 51 and 52, wherein the plasticizer comprises diethyl phthalate.

Embodiment 15: The embodiment of any one of embodiments 1-4, 6, 8-14, 51 and 52, wherein the anti-blocking agent comprises silica.

Embodiment 16: The embodiment of any one of embodiments 1-6 and 8-15, wherein the primary film comprises from 60 wt % to 95 wt % cellulose acetate, from 5 to 40 wt. % plasticizer and from 0.01 to 10 wt. % anti-blocking agent.

Embodiment 17: The embodiment of any one of embodiments 1-16, wherein the primary film further comprises a releasing agent.

Embodiment 18: The embodiment of any one of embodiments 1-6 and 8-17, wherein the anti-blocking agent has an average particle size less than 3 microns, preferably less than 1 micron or from 0.02 to 1 micron.

Embodiment 19: The embodiment of any one of embodiments 1-18, 51 and 52, wherein the anti-fog composition has a thickness ranging from 25 microns to 2000 microns.

Embodiment 20: The embodiment of any one of embodiments 1-19, 52 and 52, wherein the anti-fog composition is in the form of a rolled sheet.

Embodiment 21: The embodiment of any one of embodiments 1-20 and 52, wherein the anti-fog composition does not comprise discrete layers.

Embodiment 22: The embodiment of any one of embodiments 1-21, 51 and 52, further comprising a protective film adhered to one of the major planar surfaces.

Embodiment 23: The embodiment of embodiment 22, wherein the protective film comprises a protective material selected from polyesters, polyethylenes, and polyethylene terephthalate, and wherein the protective film is adhered to at least one of the major planar surfaces with an adhesive.

Embodiment 24: The embodiment of any one of embodiments 22 and 23, further comprising an adhesive layer disposed on the other of the major planar surfaces of the primary film.

Embodiment 25: The embodiment of any one of embodiments 1-24, further comprising a secondary film adhered to the primary film and having substantially the same composition as the primary film.

Embodiment 26: The embodiment of any one of embodiments 1-24, further comprising a secondary film adhered to the primary film and having a composition different from the primary film.

Embodiment 27: The embodiment of any one of embodiments 1-24 or 26, wherein the secondary film comprises cellulose acetate, wherein the cellulose acetate in the secondary film has a degree of substitution greater than the degree of substitution of the primary film.

Embodiment 28: A consumer product having a planar surface and the composition of any one of embodiments 1-27, 51 and 52, disposed on said planar surface.

Embodiment 29: The embodiment of embodiment 28, wherein the consumer product is selected from the group consisting of lenses, windows, screens, glass structures, containers, appliances, plastic, optical devices, and visors.

Embodiment 30: The embodiment of embodiment 28, wherein the consumer product is a refrigerating device.

Embodiment 31: The embodiment of any one of embodiments 28-30, wherein the anti-fog composition is adhered to said planar surface with an adhesive.

Embodiment 32: A process for producing an anti-fog composition comprising a primary film, the process comprising the steps of:
(a) combining cellulose acetate, a plasticizer, a anti-blocking agent having an average particle size ranging from 0.02 microns to 6 microns and solvent to form a dope;
(b) casting the dope to form a precursor film
(c) contacting the precursor film with a caustic solution to form a treated film;
(d) washing the treated film to form a washed film; and
(e) drying the washed film to form the primary film.

Embodiment 33: The embodiment of embodiment 32, wherein the primary film has opposing major planar surfaces and a central coplanar region disposed between said opposing major planar surfaces, wherein said cellulose acetate has a degree of substitution that increases from the opposing major planar surfaces toward the central coplanar region.

Embodiment 34: The embodiment of any one of embodiments 32, 33, and 52, further comprising the step of treating the precursor film with acetone prior to the contacting step.

Embodiment 35: The embodiment of any one of embodiments 32-34, wherein the precursor film has a degree of substitution ranging from 2.0 to 2.6, preferably from 2.2 to 2.55.

Embodiment 36: The embodiment of any one of embodiments 32-35, wherein the dope comprises cellulose acetate flake.

Embodiment 37: The embodiment of any one of embodiments 32-36 and 52, wherein the caustic solution comprises an aqueous hydroxide solution.

Embodiment 38: The embodiment of any one of embodiments 32-37 and 52, wherein the caustic solution comprises a 5 to 20 wt. % potassium hydroxide solution.

Embodiment 39: The embodiment of any one of embodiments 32-38 and 52, wherein the contacting is conducted for a residence time ranging from 0.5 minutes to 20 minutes, preferably from 2 minutes to 10 minutes.

Embodiment 40: The embodiment of any one of embodiments 32-39 and 52, wherein the contacting is conducted at a temperature ranging from 40° C. to 100° C.

Embodiment 41: The embodiment of any one of embodiments 32-40 and 52, wherein the washing is conducted at a temperature ranging from 0° C. to 50° C.

Embodiment 42: The embodiment of any one of embodiments 32-41 and 52, wherein the drying is conducted at a temperature ranging from 50° C. to 120° C.

Embodiment 43: The embodiment of any one of embodiments 32-42, 51 and 52, wherein the anti-fog composition has a fog time greater than 10 seconds, preferably greater than 20 seconds, more preferably greater than 30 seconds.

Embodiment 44: The embodiment of any one of embodiments 32-43, 51 and 52, wherein the anti-fog composition has a haze value ranging from 0.1% to 4.0%, preferably from 0.1% to 2.0% as measured by ASTM D1003.

Embodiment 45: A process for producing a multi-layer anti-fog film composition, comprising the steps of:
providing a first anti-fog film composition comprising
a cellulose acetate
a plasticizer; and
an anti-blocking agent having an average particle diameter ranging from 0.02 microns to 6 microns; and
selecting a second film composition based on a first preferred characteristic; and
adhering the first anti-fog film composition to the second film composition to form the multi-layer anti-fog film composition having enhanced characteristics.

Embodiment 46: The embodiment of embodiment 45, wherein the preferred characteristic is selected such that the first anti-fog composition improves the preferred characteristic.

Embodiment 47: A multi-layer anti-fog composition, comprising:
a primary film having opposing major planar surfaces and a central coplanar region disposed between the opposing major planar surfaces and comprising cellulose acetate having a first degree of substitution less than 2.6; and a secondary film having opposing major planar surfaces and a central coplanar region disposed between the opposing major planar surfaces, one of the opposing major surfaces of the secondary film being adhered to one of the opposing major planar surfaces of the primary film, the secondary film comprising cellulose acetate having a second degree of substitution greater than the first degree of substitution.

Embodiment 48: The embodiment of embodiment 47, further comprising an additional film adhered to the other of the opposing major planar surfaces of the secondary film.

Embodiment 49: The embodiment of embodiment 48, wherein the additional film has opposing major planar surfaces and a central coplanar region disposed between the opposing major planar surfaces and wherein one of the opposing major surfaces is adhered to the other of the opposing major planar surfaces of the secondary film.

Embodiment 50: The embodiment of embodiment 49, wherein the additional film comprises cellulose acetate having a degree of substitution greater than the second degree of substitution.

Embodiment 51: A multi-layer anti-fog composition, comprising:

a first primary film having opposing major planar surfaces and a central coplanar region disposed between the opposing major planar surfaces and comprising cellulose acetate, plasticizer, and an anti-blocking agent, optionally silica, having an average particle size ranging from 0.02 microns to 6 microns, wherein the cellulose acetate has a degree of substitution that increases from the opposing major planar surfaces toward the central coplanar region;

a secondary film, optionally comprising a single film or multiple adhered films of same or different compositions, having opposing major planar surfaces and a central coplanar region disposed between the opposing major planar surfaces, one of the opposing major surfaces of the secondary film being adhered to one of the opposing major planar surfaces of the first primary film, the secondary film optionally having a substantially uniform degree of substitution about its cross-sectional thickness; and a second primary film having opposing major planar surfaces and a central coplanar region disposed between the opposing major planar surfaces and comprising cellulose acetate, plasticizer, and an anti-blocking agent, optionally silica, having an average particle size ranging from 0.02 microns to 6 microns, wherein the cellulose acetate has a degree of substitution that increases from the opposing major planar surfaces toward the central coplanar region, wherein the other of the opposing major surfaces of the secondary film is adhered to one of the opposing major planar surfaces of the second primary film.

Embodiment 52: A process for producing an anti-fog composition comprising a primary film, the process comprising the steps of:

(a) extruding pellets comprising cellulose acetate, a plasticizer, and optionally an anti-blocking agent having an average particle size ranging from 0.02 microns to 6 microns, and optionally an antioxidant and/or a heat stabilizer, to form a precursor film, preferably having a thickness less than 300 microns, more preferably less than 200 microns;

(b) contacting the precursor film with a caustic solution to form a treated film;

(c) washing the treated film to form a washed film; and (d) drying the washed film to form the primary film.

Examples

Sample anti-fog compositions were prepared using a solvent casting method. Dope Solutions 1-8 utilized the components and weight percentages shown in Table 1. The particle size of the silica anti-blocking agent ranged from 0.02 microns to 6 microns.

TABLE 1

| Dope Solutions | | |
|---|---|---|
| Dope Solution 1 | | |
| Cellulose Acetate | Standard Flake | 100 parts |
| Plasticizer | diethyl phthalate | 27 parts |
| Anti-Blocking Agent | silica (<6 μm) | ~0.1 part |
| Additional Additives | — | — |
| Dope Solution 2 | | |
| Cellulose Acetate | Standard Flake | 100 parts |
| Plasticizer | 7TA + 3 TPP | 10 parts |
| Anti-Blocking Agent | silica (<6 μm) | ~0.1 part |
| Additional Additives | acetone | |
| | UV additive | ~0.1 part |
| Dope Solution 3 | | |
| Cellulose Acetate | Standard Flake | 100 parts |
| Plasticizer | TPP | 8 parts |
| Anti-Blocking Agent | silica (<6 μm) | ~0.1 part |
| Additional Additives | UV additive | ~0.1 part |
| Dope Solution 4 | | |
| Cellulose Acetate | Pulp Type I | 100 parts |
| Plasticizer | diethyl phthalate | 27 parts |
| Anti-Blocking Agent | silica (<6 μm) | ~0.1 part |
| Additional Additives | — | |
| Dope Solution 5 | | |
| Cellulose Acetate | Vendor 3 Pulp Type II | 100 parts |
| Plasticizer | diethyl phthalate | 27 parts |
| Anti-Blocking Agent | silica (<6 μm) | ~0.1 part |
| Additional Additives | — | |
| Dope Solution 6 | | |
| Cellulose Acetate | Standard Flake | 100 parts |
| Plasticizer | TCPP | 20 parts |
| Anti-Blocking Agent | silica (<6 μm) | ~0.1 parts |
| Additional Additives | — | — |
| Dope Solution 7 | | |
| Cellulose Acetate | Standard Flake | 100 parts |
| Plasticizer | 5TA + 5 TPP | 10 parts |
| Anti-Blocking Agent | silica (<6 μm) | ~0.1 parts |
| Additional Additives | UV additive | ~0.1 parts |
| Dope Solution 8 | | |
| Cellulose Acetate | Standard Flake | 100 parts |
| Plasticizer | TPP | 10 parts |
| Anti-Blocking Agent | silica (<6 μm) | ~0.1 parts |
| Additional Additives | acetone | |
| | UV additive | ~0.1 parts |

Dope Solutions 1-8 were solvent cast to form the respective precursor films. The precursor films were divided into samples (some with varying thicknesses) and the respective samples were submerged in a caustic solution and treated as shown in Table 2. The treated samples were then washed with water for a predetermined time and oven dried at 50° C.

The samples were tested for haze value using ASTM D1003 and fog time using the test disclosed herein. The results are shown in Table 2. Haze values were measured initially and after a predetermined period of time. The measurements shown below reflect the final haze values. In some embodiments, differences in thickness may account for differing fog and/or haze values in cases where similar treatments were employed.

TABLE 2

Process Conditions and Test Results

| Sample | Form. | Th. (gauge) | Caustic Solution (wt. %) | Treatment Temperature (° C.) | Treatment Time (minutes) | Anti-fog time (seconds) | Haze (%) |
|---|---|---|---|---|---|---|---|
| 1 | 1 | 360 | KOH; 12.3% | 70 | 5 | 60 | 0.7 |
| 2 | 1 | 360 | KOH; 12.3% | 70 | 10 | 80 | 0.7 |
| 3 | 1 | 360 | KOH; 12.3% | 60 | 5 | 40 | 0.4 |
| 4 | 1 | 360 | KOH; 12.3% | 60 | 10 | 90 | 0.4 |
| 5 | 1 | 360 | KOH; 12.3% | 60 | 5 | 50 | 0.4 |
| 6 | 1 | 360 | KOH; 12.3% | 70 | 10 | 90 | 0.5 |
| 7 | 1 | 360 | KOH; 12.3% | 65 | 5 | 40 | 0.5 |
| 8 | 1 | 360 | KOH; 12.3% | 60 | 5 | 25 | 0.5 |
| 9 | 1 | 75 | KOH; 12.3% | 60 | 5 | 70 | 0.7 |
| 10 | 1 | 75 | KOH; 12.3% | 60 | 5 | 70 | 0.7 |
| 11 | 1 | 75 | KOH; 12.3% | 60 | 10 | 120 | 0.7 |
| 12 | 1 | 75 | KOH; 12.3% | 60 | 10 | 120 | 0.7 |
| 13 | 1 | 540 | KOH; 16.4% | 65 | 10 | 70 | 0.8 |
| 14 | 1 | 540 | KOH; 16.4% | 65 | 10 | 70 | 0.8 |
| 15 | 1 | 540 | KOH; 16.4% | 65 | 10 | 80 | 0.8 |
| 16 | 1 | 540 | KOH; 16.4% | 65 | 7 | 43 | 0.8 |
| 17 | 1 | 540 | KOH; 16.4% | 65 | 7 | 45 | 0.8 |
| 18 | 1 | 540 | KOH; 16.4% | 65 | 7 | 45 | 0.8 |
| 19 | 1 | 360 | KOH; 12.4% | 30 | 5.8 | 52 | 0.9 |
| 20 | 1 | 360 | KOH; 12.4% | 30 | 7 | 84 | 1.0 |
| 21 | 1 | 360 | KOH; 12.4% | 30 | 6.4 | 75 | 0.8 |
| 22 | 1 | 360 | KOH; 13.1% | 30 | 6.4 | 90 | 0.8 |
| 23 | 1 | 360 | KOH; 13.1% | 30 | 6.4 | 55 | 0.8 |
| 24 | 1 | 180 | KOH; 13.1% | 30 | 6.4 | 69 | 0.9 |
| 25 | 1 | 180 | KOH; 13.1% | 30 | 3.8 | 57 | 0.6 |
| 26 | 1 | 75 | KOH; 13.1% | 30 | 6.4 | — | — |
| 27 | 1 | 75 | KOH; 13.1% | 30 | 3.5 | 64 | 0.4 |
| 28 | 1 | 75 | KOH; 13.1% | 30 | 3.0 | 76 | 0.4 |
| 29 | 1 | 75 | KOH; 13.1% | 30 | 3.5 | 64 | 0.4 |
| 30 | 1 | 360 | KOH; 16.0% | 30 | 5.8 | 102 | 1.0 |
| 31 | 1 | 290 | KOH; 10.3% | 60 | 10 | 50 | 0.8 |
| 32 | 1 | 310 | KOH; 10.3% | 60 | 10 | 45 | 0.9 |
| 33 | 1 | 300 | KOH; 14.3% | 60 | 10 | 67 | 0.8 |
| 34 | 1 | 360 | KOH; 12.3% | 70 | 5 | 60 | 0.7 |
| 35 | 1 | 360 | KOH; 12.3% | 70 | 10 | 80 | 0.7 |
| 36 | 1 | 360 | KOH; 12.3% | 60 | 5 | 40 | 0.4 |
| 37 | 1 | 360 | KOH; 12.3% | 60 | 10 | 90 | 0.4 |
| 38 | 1 | 360 | KOH; 12.3% | 60 | 5 | 50 | 0.4 |
| 39 | 1 | 360 | KOH; 12.3% | 70 | 10 | 90 | 0.5 |
| 40 | 1 | 360 | KOH; 12.3% | 65 | 5 | 40 | 0.5 |
| 41 | 1 | 360 | KOH; 12.3% | 60 | 5 | 25 | 0.5 |
| 42 | 1 | 75 | KOH; 12.3% | 60 | 5 | 70 | 0.7 |
| 43 | 1 | 75 | KOH; 12.3% | 60 | 5 | 70 | 0.7 |
| 44 | 1 | 75 | KOH; 12.3% | 60 | 10 | 120 | 0.7 |
| 45 | 1 | 75 | KOH; 12.3% | 60 | 10 | 120 | 0.7 |
| 46 | 1 | 540 | KOH; 16.4% | 65 | 10 | 70 | 0.8 |
| 47 | 1 | 540 | KOH; 16.4% | 65 | 10 | 70 | 0.8 |
| 48 | 1 | 540 | KOH; 16.4% | 65 | 10 | 80 | 0.8 |
| 49 | 1 | 540 | KOH; 16.4% | 65 | 7 | 43 | 0.8 |
| 50 | 1 | 540 | KOH; 16.4% | 65 | 7 | 45 | 0.8 |
| 51 | 1 | 540 | KOH; 16.4% | 65 | 7 | 45 | 0.8 |
| 52 | 1 | 300 | KOH; 12.3% | 60 | 10 | 60 | 2.0 |
| 53 | 1 | 300 | KOH; 12.3% | 60 | 8 | 50 | 2.0 |
| 54 | 2 | 350 | KOH; 16.3% | 70 | 15 | 90+ | 1.4 |
| 55 | 3 | 525 | NaOH; 6.5% | 61 | 20 | 21 | 1.6 |
| 56 | 3 | 525 | NaOH; 6.5% | 72 | 20 | 23 | 1.6 |
| 57 | 3 | 525 | NaOH; 7.0 % | 50 | 20 | 24 | 1.6 |
| 58 | 3 | 525 | KOH; 15.0% | 60 | 20 | 51 | 1.8 |
| 59 | 3 | 525 | KOH; 16.8% | 72.1 | 20 | 70 | 1.0 |
| 60 | 3 | 525 | KOH; 16.8% | 72.1 | 20 | 80 | 1.0 |
| 61 | 3 | 525 | KOH; 16.8% | 72.1 | 20 | 80 | 1.0 |
| 62 | 3 | 525 | NaOH; 6.3% | 51 | 20 | 18 | 1.7 |
| 63 | 3 | 525 | NaOH; 6.3% | 72 | 10 | 11 | 1.3 |
| 64 | 3 | 525 | NaOH; 7% | 51 | 10 | 13 | 2.0 |
| 65 | 3 | 525 | NaOH; 7% | 60 | 20 | 20 | 2.1 |
| 66 | 3 | 525 | NaOH; 7% | 62 | 10 | 11 | 1.7 |
| 67 | 3 | 525 | NaOH; 7% | 72 | 20 | 31 | 3.6 |
| 68 | 3 | 525 | NaOH; 7% | 71 | 10 | 14 | 1.3 |
| 69 | 3 | 525 | NaOH; 7.7% | 52 | 20 | 19 | 2.6 |
| 70 | 3 | 525 | NaOH; 7.7% | 52 | 10 | 11 | 1.1 |
| 71 | 3 | 525 | NaOH; 7.7% | 61 | 20 | 26 | 3.7 |
| 72 | 3 | 525 | NaOH; 7.7% | 73 | 10 | 13 | 1.9 |
| 73 | 3 | 525 | NaOH; 7% | 71 | 20 | 28 | 3.8 |
| 74 | 3 | 525 | NaOH; 7% | 71 | 10 | 17 | 2.4 |

TABLE 2-continued

Process Conditions and Test Results

| Sample | Form. | Th. (gauge) | Caustic Solution (wt. %) | Treatment Temperature (° C.) | Treatment Time (minutes) | Anti-fog time (seconds) | Haze (%) |
|---|---|---|---|---|---|---|---|
| 75 | 3 | 525 | NaOH; 7% | 72 | 10 | 14 | 2.2 |
| 76 | 3 | 525 | KOH; 17.5% | 70 | 10 | 11 | 2.3 |
| 77 | 3 | 525 | KOH; 15% | 60 | 20 | 43 | 2.1 |
| 78 | 3 | 525 | KOH; 17.5% | 62.7 | 15 | 40 | 2.4 |
| 79 | 3 | 525 | KOH; 17.5% | 62.6 | 20 | 39 | 2.3 |
| 80 | 3 | 525 | KOH; 17.5% | 72.2 | 15 | 31 | 2.2 |
| 81 | 3 | 525 | KOH; 17.5% | 70 | 15 | 60 | 3.8 |
| 82 | 3 | 525 | KOH; 17.5% | 70 | 15 | 60 | 3.5 |
| 83 | 3 | 525 | KOH; 16% | 70 | 15 | 42 | 3.1 |
| 84 | 3 | 525 | KOH; 16% | 70 | 15 | 38 | 2.2 |
| 85 | 3 | 525 | KOH; 16% | 70 | 10 | 14 | 1.3 |
| 86 | 3 | 525 | KOH; 16% | 60 | 20 | 39 | 2.5 |
| 87 | 3 | 525 | KOH; 16% | 60 | 20 | 17 | 3.0 |
| 88 | 4 | 280 | KOH; 10.3% | 60 | 10 | 40 | 0.7 |
| 89 | 4 | 300 | KOH; 10.3% | 60 | 11 | 36 | 0.6 |
| 90 | 4 | 300 | KOH; 10.3% | 60 | 10 | 40 | 0.6 |
| 91 | 4 | 300 | KOH; 14.3% | 60 | 11 | 52 | 0.7 |
| 92 | 4 | 70 | KOH; 10.3% | 60 | 10 | 90 | 0.7 |
| 93 | 4 | 500 | KOH; 10.3% | 60 | 10 | 36 | 0.8 |
| 94 | 4 | 500 | KOH; 10.3% | 60 | 10 | 34 | 0.4 |
| 95 | 5 | 315 | KOH; 10.3% | 60 | 10 | 43 | 1.4 |
| 96 | 5 | 315 | KOH; 10.3% | 60 | 10 | 26 | 1.7 |
| 97 | 6 | 230 | KOH; 12.3% | 60 | 10 | 60 | 1.1 |
| 98 | 6 | 250 | KOH; 12.3% | 60 | 10 | 120 | 1.4 |
| 99 | 7 | 250 | KOH; 16.3% | 70 | 15 | 90+ | 3.0 |
| 100 | 8 | 300 | KOH; 16% | 70 | 15 | 54 | 2.3 |

The test results shown in Table 2 demonstrate that desirable anti-fog compositions having high anti-fog times, e.g., greater than 20 seconds, and low haze values, e.g., less than 1.5, surprisingly and unexpectedly may be prepared by treating with a caustic solution precursor films formed from a dope comprising cellulose acetate, plasticizer and small-particle anti-blocking agent.

Comparative Examples

Sample anti-fog compositions were prepared using the casting method. Comparative Dope Solutions A and B utilized the components and weight percentages shown in Table 3. The particle size of the silica (large particles) was greater than 6 microns.

TABLE 3

| Comparative Dope Solutions | | |
|---|---|---|
| Comparative Dope Solution A | | |
| Cellulose Acetate | Standard Flake | 100 parts |
| Plasticizer | diethyl phthalate | 27 parts |
| Anti-Blocking Agent | silica (>6 µm) | ~0.1 part |
| Additional Additives | — | — |

TABLE 3-continued

| Comparative Dope Solutions | | |
|---|---|---|
| Comparative Dope Solution B | | |
| Cellulose Acetate | Standard Flake | 100 parts |
| Plasticizer | 7TA + 3 TPP | 24 parts |
| Anti-Blocking Agent | silica (>6 µm) | ~0.1 part |
| Additional Additives | — | — |

Comparative Dope Solutions A and B were solvent cast to form respective precursor films. The precursor films were divided into samples (some with varying thicknesses) and the respective samples were submerged in a caustic solution and treated as shown in Table 4. The treated samples were then washed with water for a predetermined time and oven dried at 50° C.

The samples were tested for haze value using ASTM D1003 and fog time using the test discussed herein. The results are shown in Table 4. Haze values were measured initially and after a predetermined period of time. The measurements shown below reflect the final haze values. In some embodiments, differences in thickness may account for differing fog and/or haze values in cases where similar treatments were employed.

TABLE 4

Process Conditions and Test Results

| Sample | Form. | Th. (gauge) | Caustic Solution (wt %) | Treatment Temperature (° C.) | Treatment Time (minutes) | Anti-fog time, (seconds) | Haze (%) |
|---|---|---|---|---|---|---|---|
| A1 | A | 350 | KOH; 10.3% | 40 | 10 | 21 | 8.7 |
| A2 | A | 350 | KOH; 10.3% | 42 | 10 | 19 | 8.5 |
| A3 | A | 350 | KOH; 10.3% | 35 | 10 | 20 | 7.9 |
| A4 | A | 350 | KOH; 10.3% | 30 | 15 | 44 | 8.7 |

TABLE 4-continued

Process Conditions and Test Results

| Sample | Form. | Th. (gauge) | Caustic Solution (wt %) | Treatment Temperature (° C.) | Treatment Time (minutes) | Anti-fog time, (seconds) | Haze (%) |
|---|---|---|---|---|---|---|---|
| A5 | A | 350 | KOH; 10.3% | 30 | 20 | 46 | 10.2 |
| A6 | A | 350 | KOH; 10.3% | 40 | 15 | 46 | 10.3 |
| A7 | A | 350 | KOH; 10.3% | 40 | 20 | 48 | 9.8 |
| A8 | A | 350 | KOH; 10.3% | 30 | 10 | 12 | 8.3 |
| A9 | A | 350 | KOH; 10.3% | 30 | 10 | 13 | 8.5 |
| A10 | A | 350 | KOH; 10.3% | 30 | 15 | 15 | 8.4 |
| A11 | A | 350 | KOH; 10.3% | 40 | 20 | 23 | 9.1 |
| A12 | A | 350 | KOH; 10.3% | 40 | 15 | 25 | 8.6 |
| A13 | A | 350 | KOH; 10.3% | 30 | 20 | 42 | 9.1 |
| A14 | A | 350 | KOH; 10.3% | 35 | 10 | 16 | 8.4 |
| A15 | A | 350 | KOH; 10.3% | 35 | 20 | 27 | 9 |
| A16 | A | 350 | KOH; 10.3% | 60 | 10 | 48 | 9.3 |
| A17 | A | 350 | KOH; 10.3% | 60 | 10 | 60 | 9.2 |
| A18 | A | 350 | KOH; 10.3% | 60 | 15 | 88 | 9.5 |
| A19 | A | 350 | KOH; 20.5% | 41 | 20 | 14 | 13 |
| A20 | A | 350 | KOH; 20.5% | 42 | 20 | 16 | 13.1 |
| A21 | A | 350 | KOH; 20.5% | 37 | 15 | 10 | 9.8 |
| A22 | A | 350 | KOH; 20.5% | 40 | 15 | 11 | 10.7 |
| A23 | A | 350 | KOH; 20.5% | 41 | 10 | 7 | 9.1 |
| A24 | A | 350 | KOH; 20.5% | 41 | 10 | 8 | 9.1 |
| A25 | A | 350 | KOH; 20.5% | 41 | 5 | 6 | 8.6 |
| A26 | A | 350 | KOH; 20.5% | 40 | 5 | 8 | 7.6 |
| A27 | A | 350 | KOH; 20.5% | 60 | 20 | 120 | 11.1 |
| A28 | A | 350 | KOH; 20.5% | 61 | 20 | 127 | 11.5 |
| A29 | A | 350 | KOH; 20.5% | 62 | 15 | 115 | 10.7 |
| A30 | A | 350 | KOH; 20.5% | 61 | 15 | 103 | 11.2 |
| A31 | A | 350 | KOH; 20.5% | 61 | 5 | 34 | 11.1 |
| A32 | A | 350 | KOH; 20.5% | 61 | 5 | 38 | 10.6 |
| A33 | A | 350 | KOH; 20.5% | 62 | 10 | 93 | 10.6 |
| A34 | A | 350 | KOH; 20.5% | 61 | 10 | 80 | 9.6 |
| A35 | A | 350 | NaOH; 7.0% | — | — | 0.5 | 6.3 |
| A36 | A | 350 | NaOH; 7.0% | 30 | 10 | 3 | 9.2 |
| A37 | A | 350 | NaOH; 7.0% | 31 | 10 | 3 | 9.2 |
| A38 | A | 350 | NaOH; 7.0% | 30 | 20 | 6 | 10.6 |
| A39 | A | 350 | NaOH; 7.0% | 31 | 20 | 7 | 10.5 |
| A40 | A | 350 | NaOH; 7.0% | 36 | 20 | 5 | 10.8 |
| A41 | A | 350 | NaOH; 7.0% | 40 | 20 | 14 | 9.6 |
| A42 | A | 350 | NaOH; 7.0% | 31 | 15 | 5 | 10.0 |
| A43 | A | 350 | NaOH; 7.0% | 32 | 15 | 6 | 9.1 |
| A44 | A | 350 | NaOH; 7.0% | 34 | 10 | 5 | 8.5 |
| A45 | A | 350 | NaOH; 7.0% | 36 | 10 | 6 | 8.5 |
| A46 | A | 350 | NaOH; 7.0% | 36 | 20 | 9 | 9.8 |
| A47 | A | 350 | NaOH; 7.0% | 39 | 15 | 13 | 9.3 |
| A48 | A | 350 | NaOH; 7.0% | 41 | 15 | 11 | 8.8 |
| A49 | A | 350 | NaOH; 7.0% | 40 | 20 | 13 | 9.5 |
| A50 | A | 350 | KOH; 10.3% | 30 | 15 | 44 | 6.3 |
| A51 | A | 350 | KOH; 10.3% | 30 | 20 | 46 | 6.3 |
| A52 | A | 350 | KOH; 10.3% | 40 | 15 | 46 | 6.3 |
| A53 | A | 350 | KOH; 10.3% | 40 | 20 | 48 | 6.3 |
| A54 | A | 350 | KOH; 10.3% | 30 | 20 | 42 | 6.3 |
| A55 | A | 350 | KOH; 10.3% | 60 | 10 | 48 | 6.3 |
| A56 | A | 350 | KOH; 10.3% | 60 | 10 | 60 | 6.3 |
| A57 | A | 350 | KOH; 10.3% | 60 | 15 | 88 | 6.3 |
| A58 | A | 360 | KOH; 10.3% | 32 | 11 | 24 | 6.0 |
| A59 | A | 360 | KOH; 10.3% | 31 | 15 | 25 | 6.1 |
| A60 | A | 360 | KOH; 10.3% | 40 | 12 | 21 | 6.0 |
| A61 | A | 360 | KOH; 10.3% | 40 | 15 | 36 | 6.0 |
| A62 | A | 360 | KOH; 10.3% | 48 | 16 | 56 | 5.9 |
| A63 | A | 360 | KOH; 10.3% | 49 | 10 | 28 | 6.0 |
| A64 | A | 360 | KOH; 10.3% | 60 | 10 | 84 | 6.0 |
| A65 | A | 360 | KOH; 10.3% | 60 | 15 | 97 | 6.1 |
| A66 | A | 360 | KOH; 10.3% | 60 | 10 | — | 6.0 |
| A67 | A | 360 | KOH; 10.3% | 47 | 15 | 55 | 6.0 |
| A68 | A | 360 | KOH; 10.3% | 48 | 15 | 48 | 5.9 |
| A69 | A | 360 | KOH; 10.3% | 50 | 15 | 56 | 6.0 |
| A70 | A | 360 | KOH; 10.3% | 50 | 15 | 56 | 6.0 |
| A71 | A | 360 | KOH; 10.3% | 50 | 15 | 90 | 6.0 |
| A72 | A | 360 | KOH; 10.3% | 60 | 15 | 101 | 6.0 |
| A73 | A | 360 | KOH; 10.3% | 60 | 10 | 63 | 5.9 |
| A74 | A | 360 | KOH; 10.3% | 60 | 10 | 68 | 6.0 |
| A75 | A | 360 | KOH; 10.3% | 60 | 10 | 2 | 6.0 |
| A76 | A | 360 | KOH; 10.3% | 60 | 10 | 2 | 6.0 |
| A77 | A | 360 | KOH; 10.3% | 60 | 10 | 32 | 5.9 |
| A78 | A | 360 | KOH; 10.3% | 60 | 15 | 77 | 6.0 |

TABLE 4-continued

Process Conditions and Test Results

| Sample | Form. | Th. (gauge) | Caustic Solution (wt %) | Treatment Temperature (° C.) | Treatment Time (minutes) | Anti-fog time, (seconds) | Haze (%) |
|---|---|---|---|---|---|---|---|
| A79 | A | 360 | KOH; 10.3% | 60 | 10 | 46 | 5.9 |
| A80 | A | 360 | KOH; 12.3% | 60 | 10 | 80 | 5.9 |
| A81 | A | 360 | KOH; 12.3% | 60 | 10 | 48 | 5.9 |
| A82 | A | 500 | KOH; 12.3% | 60 | 10 | 70 | 4.1 |
| A83 | A | 500 | KOH; 12.3% | 60 | 10 | 30 | 4.1 |
| A84 | A | 360 | KOH; 12.3% | 40 | 10 | 14 | 5.9 |
| A85 | A | 360 | KOH; 12.3% | 40 | 10 | 12 | 5.9 |
| A86 | A | 360 | KOH; 12.3% | 60 | 10 | 40 | 5.9 |
| A87 | A | 360 | KOH; 12.3% | 60 | 10 | 70 | 5.9 |
| A88 | A | 360 | KOH; 12.3% | 60 | 10 | 80 | 5.9 |
| A89 | A | 360 | KOH; 12.3% | 60 | 10 | 80 | 5.9 |
| A90 | A | 360 | KOH; 12.3% | 60 | 10 | 65 | 5.9 |
| A91 | A | 360 | KOH; 12.3% | 60 | 10 | 90 | 5.6 |
| A92 | A | 360 | KOH; 12.3% | 60 | 10 | 80 | 5.6 |
| A93 | A | 360 | KOH; 12.3% | 60 | 10 | 90 | 5.6 |
| A94 | A | 360 | KOH; 12.3% | 60 | 10 | 96 | 5.6 |
| A95 | A | 360 | KOH; 12.3% | 60 | 10 | 80 | 5.6 |
| A96 | A | 360 | KOH; 12.3% | 40 | 5 | 10 | 5.6 |
| A97 | A | 360 | KOH; 12.3% | 40 | 5 | 10 | 5.6 |
| A98 | A | 360 | KOH; 12.3% | 40 | 5 | 10 | 5.6 |
| A99 | A | 360 | KOH; 12.3% | 45 | 10 | 16 | 5.8 |
| A100 | A | 360 | KOH; 12.3% | 45 | 15 | 28 | 5.8 |
| A101 | A | 360 | KOH; 12.3% | 45 | 10 | 19 | 5.8 |
| A102 | A | 360 | KOH; 12.3% | 60 | 10 | 64 | 5.8 |
| A103 | A | 360 | KOH; 12.3% | 60 | 10 | 70 | 5.8 |
| A104 | A | 360 | KOH; 12.3% | 60 | 10 | 60 | 5.8 |
| A105 | A | 360 | KOH; 12.3% | 60 | 10 | 80 | 5.8 |
| A106 | A | 360 | KOH; 12.3% | 60 | 10 | 82 | 5.8 |
| A107 | A | 360 | KOH; 12.3% | 60 | 10 | 90 | 5.8 |
| A108 | A | 360 | KOH; 12.3% | 60 | 10 | 88 | 5.8 |
| A109 | A | 360 | KOH; 12.3% | 60 | 5 | 45 | 5.8 |
| A110 | A | 360 | KOH; 12.3% | 60 | 5 | 60 | 5.8 |
| A111 | A | 360 | KOH; 12.3% | 60 | 5 | 60 | 5.8 |
| B1 | B | 360 | — | — | — | 0.5 | 4.2 |
| B2 | B | 360 | NaOH; 7.0% | 40 | 5 | — | 4.2 |
| B3 | B | 360 | NaOH; 7.0% | 40 | 5 | — | 4.1 |
| B4 | B | 360 | NaOH; 2.4% | 35 | 5 | — | 4.1 |
| B5 | B | 360 | NaOH; 2.4% | 35 | 2.5 | — | 4.2 |
| B6 | B | 360 | NaOH; 2.4% | 35 | 0.5 | 2 | 4.2 |
| B7 | B | 360 | NaOH; 1.9% | 30 | 2 | 3 | 4.2 |
| B8 | B | 360 | NaOH; 1.9% | 30 | 5 | — | 4.2 |
| B9 | B | 360 | NaOH; 1.9% | 30 | 3 | — | 4.1 |
| B10 | B | 360 | NaOH; 1.9% | 30 | 2.5 | — | 4.2 |
| B11 | B | 360 | NaOH; 1.9% | 40 | 2 | — | 4.2 |
| B12 | B | 360 | NaOH; 1.9% | 40 | 1 | 5 | 4.2 |

The test results shown in Table 4 demonstrate that by utilizing conventional compositions to form precursor films, anti-fog compositions having low anti-fog times, e.g., less than 20 seconds and/or high haze values, e.g., greater than 1.5, are undesirably achieved.

While the invention has been described in detail, modifications within the spirit and scope of the invention will be readily apparent to those of skill in the art. It should be understood that aspects of the invention and portions of various embodiments and various features recited herein and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention.

We claim:

1. An anti-fog film, comprising a primary film having opposing major planar surfaces and a central coplanar region disposed between said opposing major planar surfaces, said primary film comprising
   cellulose acetate consisting essentially of cellulose diacetate,
   plasticizer, and
   an anti-blocking agent having an average particle size ranging from 0.02 microns to 6 microns,
   wherein the film has been saponified in a caustic solution for a residence time of 5 minutes or greater, such that the cellulose acetate has a degree of substitution that increases from the opposing major planar surfaces toward the central coplanar region; and
   wherein the caustic solution comprises:
   a 5 wt % to 10 wt % sodium hydroxide solution; or
   a 10 wt % to 20 wt % potassium hydroxide solution; and
   wherein the anti-fog film has a fog time greater than 10 seconds and/or a haze value ranging from 0.1% to 4.0%, as measured by ASTM D1003.

2. The anti-fog film of claim 1, wherein the anti-fog film has a degree of substitution at the opposing major planar surfaces of about zero.

3. The anti-fog film of claim 1, wherein the anti-fog film composition has a degree of substitution at the central coplanar region from 2.2 to 2.55.

4. The anti-fog film of claim 1, wherein the anti-fog film has a haze value ranging from 0.1% to 4.0%, as measured by ASTM D1003.

5. The anti-fog film of claim 1, wherein the plasticizer is selected from the group consisting of 1,2,3-triacetoxypropane (triacetin), tributyl citrate, triethyl citrate, triphenyl phosphate, tris(clorisopropyl)phosphate, dimethyl phthalate, bornan-2-one, PEG-DGE, PPG-DGE, tributyl phosphate, and combinations thereof.

6. The anti-fog film of claim 1, wherein the plasticizer comprises diethyl phthalate and/or the anti-blocking agent comprises silica.

7. The anti-fog film of claim 1, wherein the primary film comprises from 60 wt % to 95 wt % cellulose acetate, from 5 to 40 wt. % plasticizer and from 0.01 to 10 wt. % anti-blocking agent.

8. The anti-fog film of claim 1, wherein the primary film further comprises a releasing agent.

9. The anti-fog film of claim 1, wherein the anti-fog film has a thickness ranging from 25 microns to 2000 microns.

10. The anti-fog film of claim 1, wherein the primary film does not comprise discrete layers.

11. A consumer product having a planar surface and the anti-fog film of claim 1 disposed on said planar surface.

12. The consumer product of claim 11, wherein the consumer product is selected from the group consisting of lenses, windows, screens, glass structures, containers, appliances, plastic, refrigerating devices, optical devices, and visors.

13. The anti-fog film of claim 1, wherein primary film comprises from 10 wt % to 30 wt % of a plasticizer selected from the group consisting of 1,2,3-triacetoxypropane (triacetin), tributyl citrate, triethyl citrate, triphenyl phosphate, tris(clorisopropyl)phosphate, dimethyl phthalate, bornan-2-one, PEG-DGE, PPG-DGE, tributyl phosphate, and combinations thereof.

14. The anti-fog film of claim 1, wherein the film has been saponified in the caustic solution at a temperature greater than 40° C.

15. An anti-fog film, comprising a primary film having a thickness, opposing major planar surfaces and a central coplanar region disposed between the opposing major planar surfaces, the primary film comprising
cellulose acetate consisting essentially of cellulose diacetate,
plasticizer, and
an anti-blocking agent having an average particle size less than 6 microns,
wherein the film has been saponified in a caustic solution comprising from 5 wt % to 20 wt % of an alkali solution for a residence time of 5 minutes or greater such that the cellulose acetate has a degree of substitution throughout the thickness of the primary film is substantially uniform, and;
wherein the caustic solution comprises:
a 5 wt % to 10 wt % sodium hydroxide solution; or
a 10 wt % to 20 wt % potassium hydroxide solution; and
wherein the anti-fog film has a fog time greater than 10 seconds and/or a haze value ranging from 0.1% to 4.0%, as measured by ASTM D1003.

16. The anti-fog film of claim 15, wherein the degree of substitution of the cellulose acetate at the central coplanar region is not greater than 10% different from the degree of substitution of at least one of the opposing major planar surfaces.

17. The anti-fog film of claim 15, wherein the anti-fog film has a haze value ranging from 0.1% to 4.0%, as measured by ASTM D1003.

18. The anti-fog film of claim 15, wherein the plasticizer comprises diethyl phthalate and/or the anti-blocking agent comprises silica.

19. The anti-fog film of claim 15, wherein primary film comprises from 10 wt % to 30 wt % of a plasticizer selected from the group consisting of 1,2,3-triacetoxypropane (triacetin), tributyl citrate, triethyl citrate, triphenyl phosphate, tris(clorisopropyl)phosphate, dimethyl phthalate, bornan-2-one, PEG-DGE, PPG-DGE, tributyl phosphate, and combinations thereof.

20. The anti-fog film of claim 15, wherein the film has been saponified in the caustic solution at a temperature greater than 40° C.

* * * * *